United States Patent
Ohshima et al.

(10) Patent No.: US 10,659,124 B2
(45) Date of Patent: May 19, 2020

(54) MULTIANTENNA COMMUNICATION DEVICE AND COEFFICIENT UPDATE METHOD

(71) Applicant: FUJITSU LIMITED, Kawasaki-shi, Kanagawa (JP)

(72) Inventors: Takenori Ohshima, Kawasaki (JP); Yoji Ohashi, Fucyu (JP); Hiroyoshi Ishikawa, Kawasaki (JP); Atsushi Honda, Setagaya (JP); Toru Maniwa, Setagaya (JP); Alexander Nikolaevich Lozhkin, Kawasaki (JP); Toshio Kawasaki, Kawasaki (JP); Yuichi Utsunomiya, Kawasaki (JP); Tomoya Ota, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/287,767

(22) Filed: Feb. 27, 2019

(65) Prior Publication Data

US 2019/0273541 A1  Sep. 5, 2019

(30) Foreign Application Priority Data

Mar. 1, 2018 (JP) .................................. 2018-36649
Jan. 7, 2019 (JP) ................................ 2019-000468

(51) Int. Cl.
*H04L 27/00* (2006.01)
*H04B 7/06* (2006.01)
*H04B 1/04* (2006.01)

(52) U.S. Cl.
CPC ......... *H04B 7/0617* (2013.01); *H04B 1/0475* (2013.01); *H04B 7/0697* (2013.01)

(58) Field of Classification Search
CPC ..... H04L 1/0618; H04L 1/06; H04L 27/2647; H04B 7/0669; H04B 7/0845

(Continued)

(56) References Cited

U.S. PATENT DOCUMENTS 6,091,941 A * 7/2000 Moriyama ............. H01Q 3/267
   330/149
2001/0005402 A1* 6/2001 Nagatani ............... H03F 1/3247
   375/296

(Continued)

FOREIGN PATENT DOCUMENTS

JP  2002-190712 A  7/2002
JP  2004-135263 A  4/2004

(Continued)

OTHER PUBLICATIONS

Hamanaka, T., et al., "A Simple Nonlinear Compensation Method for Beamforming Transmitter", Proceedings of the 2015 IEICE General Conference, 2015_Communication (1), p. 429, Feb. 24, 2015.

(Continued)

*Primary Examiner* — Khai Tran
(74) *Attorney, Agent, or Firm* — Arent Fox LLP

(57) ABSTRACT

A multiantenna communication device forms a directional beam by adding an antenna weight to respective signals of a plurality of antenna elements. The multiantenna communication device includes: a processor that executes performing distortion compensation on a transmission signal by using a distortion compensation coefficient; a plurality of power amplifiers that are provided corresponding to the antenna elements, and that amplify the transmission signal subjected to the distortion compensation by the processor; a multiplexer that multiplexes signals output from the power amplifiers to feed back; and an analog/digital (A/D) converter that A/D converts a multiplex feedback signal that is obtained by the multiplexer, wherein the processor executes updating the distortion compensation coefficient by using the multiplex feedback signal A/D converted by the A/D converter and the transmission signal.

12 Claims, 23 Drawing Sheets

(58) Field of Classification Search
USPC .............. 375/299, 267, 347, 349; 370/329; 342/368
See application file for complete search history.

(56) References Cited

U.S. PATENT DOCUMENTS

| | | |
|---|---|---|
| 2004/0085239 A1 | 5/2004 | Ukena et al. |
| 2006/0234694 A1 | 10/2006 | Kawasaki et al. |
| 2013/0259154 A1* | 10/2013 | Ishikawa ............... H04B 15/00 375/296 |
| 2014/0092850 A1* | 4/2014 | Ko ...................... H04B 7/0639 370/329 |
| 2015/0236656 A1* | 8/2015 | Utsunomiya ......... H03F 1/3247 455/114.3 |
| 2018/0053997 A1 | 2/2018 | Noto et al. |

FOREIGN PATENT DOCUMENTS

| | | |
|---|---|---|
| JP | 2006-279668 A | 10/2006 |
| JP | 2009-213113 A | 9/2009 |
| JP | 2016-100835 A | 5/2016 |
| WO | WO 2016/167145 A1 | 10/2016 |

OTHER PUBLICATIONS

Park, C., et al., "A new digital predistortion technique for analog beamforming systems", IEICE Electronics Express, vol. 13, No. 2, 1-7, Jan. 7, 2016.

* cited by examiner

FIG.22
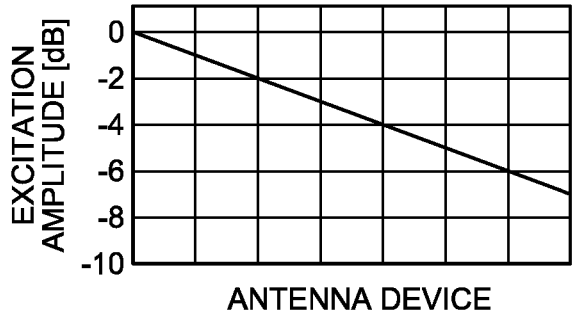
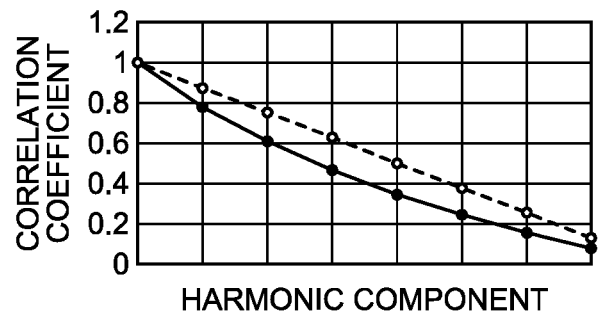
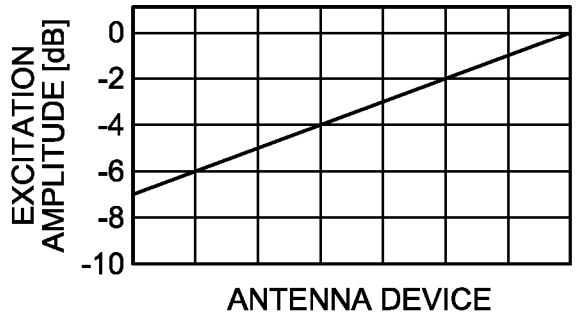
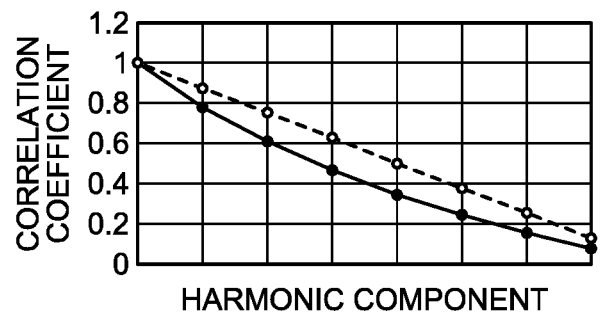
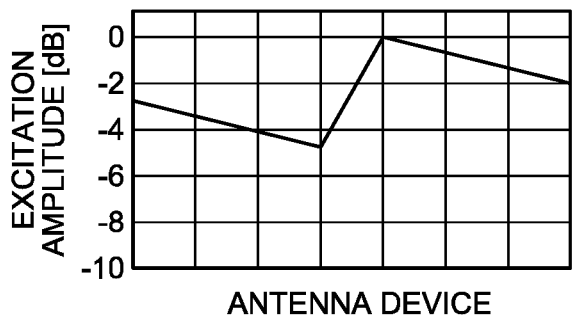
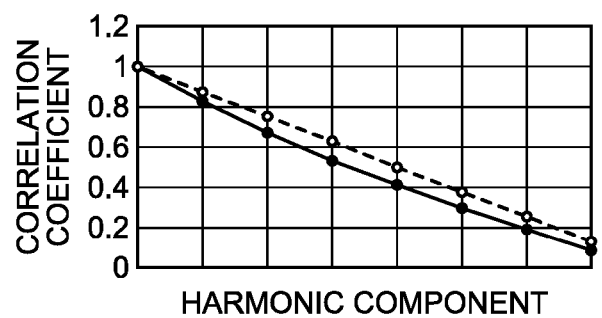
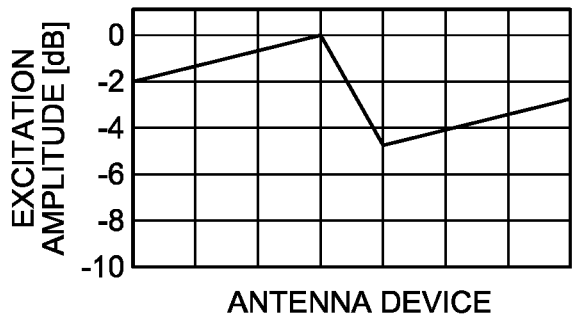
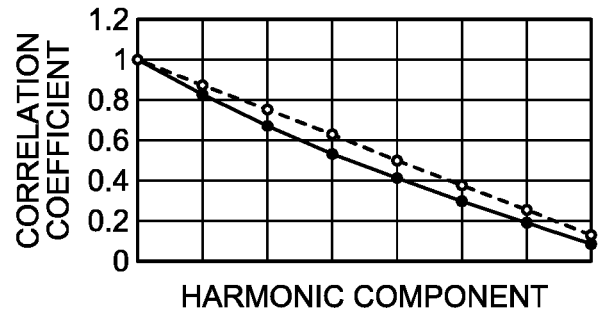

MULTIANTENNA COMMUNICATION DEVICE AND COEFFICIENT UPDATE METHOD

CROSS-REFERENCE TO RELATED APPLICATIONS

This application is based upon and claims the benefit of priority of the prior Japanese Patent Application No. 2018-36649, filed on Mar. 1, 2018 and Japanese Patent Application No. 2019-000468, filed on Jan. 7, 2019, the entire contents of which are incorporated herein by reference.

FIELD

The embodiments discussed herein are related to a multiantenna communication device and a coefficient update method.

BACKGROUND

In the viewpoint of miniaturization of transmission devices, reduction in operation costs, environmental issues, and the like, there has been a growing need for high-efficiency operation power amplifiers in recent years. When a power amplifier is operated in high efficiency, an input power is not linearly amplified in a region in which the input power is relatively high, and nonlinear distortion occurs therein. For this reason, there is a case in which an amplification method combined with digital predistortion in which inverse distortion to the nonlinear distortion that occurs in the power amplifier is added to a transmission signal in advance is used. The distortion added to a transmission signal in advance in the digital predistortion is also called distortion compensation coefficient, and is read from a lookup table, or calculated by using a polynomial expression. The distortion compensation coefficient is appropriately updated to adequately compensate the nonlinear distortion that varies according to an environment such as temperature.

On the other hand, to improve a capacity of a communication system by reducing interference of a transmission signal to unintended destinations, there is a case in which beamforming to form a directional beam is performed. When the beamforming is performed, phase differences are set to signals that are transmitted from plural antenna elements constituting an array antenna. To each of the antenna elements, for example, a phase shifter is provided to control a phase of a signal. The signal, the phase of which is controlled is amplified by a power amplifier corresponding to each antenna element.

It has been proposed to perform the digital predistortion on transmission signals collectively at one time also in the case in which a power amplifier is provided to each of plural antenna elements as described. That is, it has been considered that after a transmission signal is subjected to distortion compensation based on the distortion compensation coefficient, this transmission signal is split, and then amplified by the power amplifier of each antenna element, to be transmitted from each antenna element. In this case, update of the distortion compensation coefficient is performed, for example, by a method as follows.

A first method is to update the distortion compensation coefficient by using a feedback signal, providing, for example, a phase shifter to a feedback route from each antenna element. That is, an inverse weight to an antenna weight for the beamforming is added to a feedback signal from each antenna element by the phase shifter.

Moreover, a second method is to update the distortion compensation coefficient by using a feedback signal, providing an independent feedback circuit including an analog/digital (A/D) converter to each of the antenna elements. That is, an inverse weight to an antenna weight for the beamforming is added to a feedback signal from each antenna element by digital processing after A/D conversion.

By using these methods, a distortion compensation coefficient to compensate variations in amplitude and phase due to nonlinear distortion by removing an influence of phase variations caused by an antenna weight for the beamforming can be calculated.

Patent Document 1: Japanese Laid-open Patent Publication No. 2002-190712
Patent Document 2: Japanese Laid-open Patent Publication No. 2004-135263
Patent Document 3: Japanese Laid-open Patent Publication No. 2009-213113
Patent Document 4: Japanese Laid-open Patent Publication No. 2016-100835
Patent Document 5: International Publication Pamphlet No. WO 2016/167145
Non-Patent Document 1: Hamanaka, Toshiki, et al., "A Simple Nonlinear Compensation Method for Beamforming Transmitter", *Proceedings of the 2015 IEICE General Conference*, 2015_Communication (1), p. 429, Feb. 24, 2015
Non-Patent Document 2: Park, Chan-Won, et al., "A new digital predistortion technique for analog beamforming systems", *IEICE Electronics Express*, Vol. 13, No. 2, 1-7, Jan. 7, 2016

However, when the digital predistortion is performed in an array antenna structure, there is a disadvantage that a circuit scale of a feedback system increases. Specifically, for example, in the first method described above, because a phase shifter that adds an inverse weight to an antenna weight is provided to each antenna element, the circuit scale of the feedback system increases. Moreover, in the second method described above, because an independent feedback circuit that is equipped with an A/D converter and the like is provided to each antenna element, the circuit scale of the feedback system increases.

If the circuit scale of the feedback system increases as described, the size of the entire device increases and power consumption increases. Particularly, in recent years, it has been considered to arrange plural antenna elements not only linearly in one row, but also two-dimensionally on a plane, and the number of antenna elements tends to increase. With the increase of the antenna elements, there is a possibility that the circuit scale of the feedback system further increases.

SUMMARY

According to an aspect of an embodiment, a multiantenna communication device forms a directional beam by adding an antenna weight to respective signals of a plurality of antenna elements. The multiantenna communication device includes: a processor that executes performing distortion compensation on a transmission signal by using a distortion compensation coefficient; a plurality of power amplifiers that are provided corresponding to the antenna elements, and that amplify the transmission signal subjected to the distortion compensation by the processor; a multiplexer that multiplexes signals output from the power amplifiers to feed back; and an analog/digital (A/D) converter that A/D converts a multiplex feedback signal that is obtained by the multiplexer, wherein the processor executes updating the distortion compensation coefficient by using the multiplex feedback signal A/D converted by the A/D converter and the transmission signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 22 illustrates a specific example of a tap coefficient; and

DESCRIPTION OF EMBODIMENTS

Preferred embodiments of the present invention will be explained with reference to accompanying drawings. The embodiments are not intended to limit the present invention.

[a] First Embodiment

Figure 1:
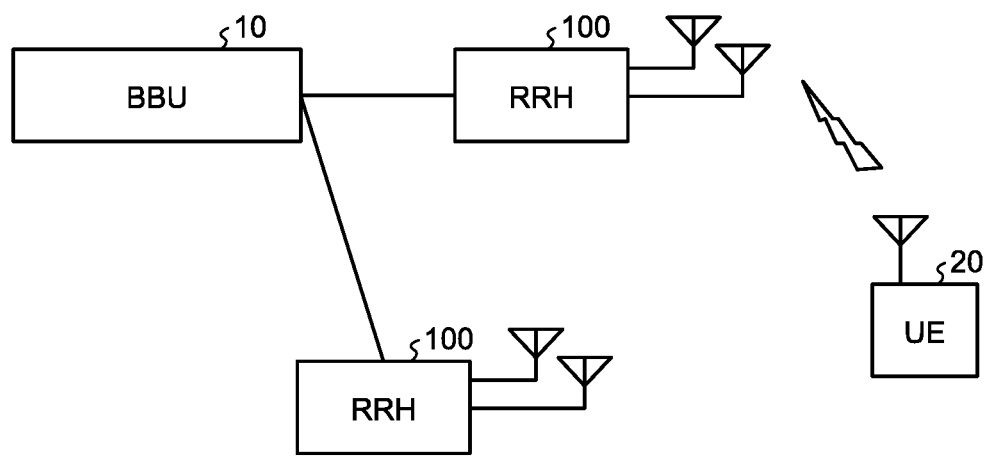
FIG. 1 illustrates an example of a communication system according to a first embodiment.

FIG. 1 illustrates an example of a communication system according to a first embodiment. In a communication system illustrated in FIG. 1, plural RRHs 100 are connected to a base band unit (BBU) 10, and the RRH 100 and a user equipment (UE) 20 perform wireless communication.

The BBU 10 is a device that performs baseband processing with respect to a signal and, for example, encodes information to generate a transmission baseband signal and transmits it to the RRH 100, or decodes a reception baseband signal received from the RRH 100.

The RRH 100 is connected to the BBU 10 in a wired manner, and generates a reception baseband signal by subjecting a transmission baseband signal generated by the BBU 10 to wireless transmission processing, or subjecting a reception signal from the UE 20 to wireless reception processing, and transmits it to the BBU 10. Moreover, the RRH 100 is a multiantenna communication device that has plural antenna elements, and adds an antenna weight to each of the antenna elements and performs beamforming at the time of wireless communication with the UE 20. Furthermore, the RRH 100 performs digital predistortion to compensate nonlinear distortion that occurs in a power amplifier arranged at each of the antenna elements. In the digital predistortion, a transmission signal is multiplied by a distortion compensation coefficient. Update of the distortion compensation coefficient is performed based on a multiplex signal obtained by multiplexing feedback signals from the respective antenna elements. A configuration and an action of the RRH 100 are described later.

The BBU 10 and the RRH 100 are also called centralized unit (CU) and distributed unit (DU), respectively, and a combination of a CU and a DU functions as a base station device. In this case, the BBU 10 serving as a CU may be connected to a core network. Moreover, the BBU 10 serving as a CU may be divided into a device that performs processing of control plane and a device that performs processing of user plane.

The UE 20 is a user terminal device, such as a mobile phone and a smartphone, and performs wireless communication with the RRH 100.

Figure 2:
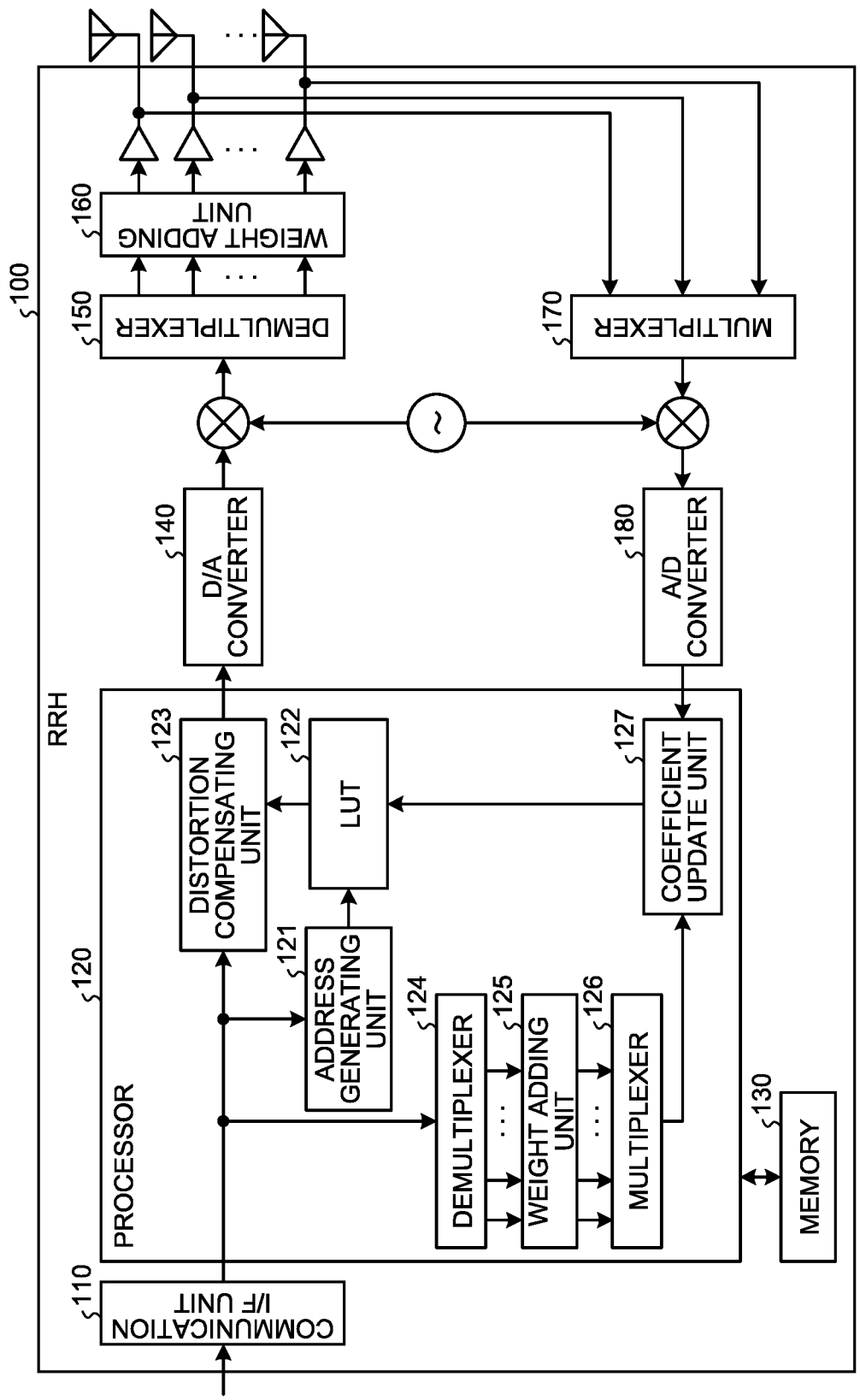
FIG. 2 is a block diagram illustrating a configuration of a remote radio head (RRH) according to the first embodiment.

FIG. 2 is a block diagram illustrating a configuration of the RRH 100 according to the first embodiment. The RRH 100 illustrated in FIG. 2 includes a communication interface unit (hereinafter, abbreviated as "communication I/F unit") 110, a processor 120, a memory 130, a digital/analog (D/A) converter 140, a demultiplexer 150, a weight adding unit 160, a multiplexer 170, and an A/D converter 180. Note that FIG. 2 illustrates a processing unit relating to processing of transmitting a signal to the UE 20, and a processing unit relating to processing of receiving a signal from the UE 20 is omitted.

The communication I/F unit 110 is an interface that is connected with the BBU 10 in a wired manner, and communicates a baseband signal with the BBU 10. Specifically, the communication I/F unit 110 receives a transmission baseband signal transmitted from the BBU 10, and transmits a reception baseband signal to the BBU 10.

The processor 120 includes, for example, a central processing unit (CPU), a field programmable gate array (FPGA)

or a digital signal processor (DSP), and the like, and has centralized control over the entire RRH 100. Specifically, the processor 120 performs distortion compensation of multiplying a transmission baseband signal received by the communication I/F unit 110 by a distortion compensation coefficient, and updates the distortion compensation coefficient. At this time, the processor 120 generates a replica signal of a signal obtained by multiplexing signals transmitted from the antenna elements included in the RRH 100 in wireless space, and updates the distortion compensation coefficient by comparing the replica signal and a multiplex feedback signal. An internal configuration of the processor 120 is described later.

The memory 130 includes, for example, a random access memory (RAM), a read-only memory (ROM), or the like and stores various information when processing is performed by the processor 120.

The D/A converter 140 D/A converts a transmission baseband signal subjected to the distortion compensation by the processor 120. An analog transmission signal obtained by the D/A conversion is upconverted by an upconverter, to be a transmission signal of a wireless frequency.

The demultiplexer 150 demultiplexes the transmission signal of a wireless frequency to output to the respective antenna elements. Demultiplexing by the demultiplexer 150 is to generate identical signals to an input transmission signal as many as the number of the antenna elements.

The weight adding unit 160 has a phase shifter per antenna element, for example, and adds an antenna weight to a signal of each antenna element. That is, the weight adding unit 160 sets a phase difference to a signal per antenna element, and performs beamforming to control a direction of a directional beam. Signals to which an antenna weight is added re amplified by respective power amplifiers of the antenna elements, and transmitted from the antenna elements. Although nonlinear distortion occurs at the amplification by the power amplifier, because the distortion compensation is performed by the processor 120 in the present embodiment, nonlinear distortion components included in a multiplex signal are reduced when the signals transmitted from the respective antenna elements are multiplexed in wireless space.

The multiplexer 170 multiplexes signals amplified by the power amplifiers of the respective antenna elements, to feed back to the processor 120. Specifically, the multiplexer 170 receives feedback of a signal output from the respective power amplifiers of the antenna elements, and generates a multiplex feedback signal (hereinafter abbreviated as "multiplex FB signal") by multiplexing these feedback signals (hereinafter abbreviated as "FB signal"). That is, the multiplexer 170 multiplexes signals output from the power amplifiers per antenna element as they are, to generate a multiplex FB signal equivalent to a signal obtained by multiplexing signals transmitted from the respective antenna elements in wireless space. The multiplex FB signal is down converted by a downconverter, to be a multiplex FB signal of a baseband frequency.

The A/D converter 180 A/D converts the multiplex FB signal. Because the multiplexer 170 multiplexes FB signals of the respective antenna elements as they are in a feedback path from the power amplifier per antenna element to the A/D converter 180, and the multiplex FB signal is to be fed back from that point, the circuit scale is suppressed to a minimum.

Next, an internal configuration of the processor 120 is described. As illustrated in FIG. 2, the processor 120 includes an address generating unit 121, a lookup table (hereinafter abbreviated as "LUT") 122, a distortion compensating unit 123, a demultiplexer 124, a weight adding unit 125, a multiplexer 126, and a coefficient update unit 127.

The address generating unit 121 generates an address to read a distortion compensation coefficient from the LUT 122 based on a power of a transmission baseband signal. That is, the address generating unit 121 generates an address corresponding to a power of the transmission baseband signal, to output to the LUT 122.

The LUT 122 stores distortion compensation coefficients, associating with respective addresses. The distortion compensation coefficient stored in the LUT 122 is not a distortion compensation coefficient that corresponds to an independent power amplifier provided per antenna element, but is a distortion compensation coefficient corresponding to a nonlinear distortion component included in a signal obtained by multiplexing signals transmitted from the respective antenna elements in wireless space. That is, the LUT 122 stores an inverse distortion to nonlinear distortion obtained by multiplexing nonlinear distortion generated at the respective power amplifiers per antenna element in wireless space, as the distortion compensation coefficient. When the address generating unit outputs an address, the LUT 122 outputs a distortion compensation coefficient stored at this address to the distortion compensating unit 123.

The distortion compensating unit 123 multiplies a transmission baseband signal by the distortion compensation coefficient output from the LUT 122, to perform the distortion compensation. The distortion compensating unit 123 outputs the transmission baseband signal subjected to the distortion compensation to the D/A converter 140.

The demultiplexer 124 demultiplexes the transmission baseband signal, to generate demultiplex signals as many as the number of the antenna elements. That is, the demultiplexer 124 demultiplexes the transmission baseband signal similarly to demultiplexing by the demultiplexer 150.

The weight adding unit 125 adds a weight equivalent to an antenna weight per antenna element to each of the demultiplex signals output from the demultiplexer 124. That is, the weight adding unit 125 adds a weight equivalent to an antenna weight added by the weight adding unit 160 to each of the demultiplex signals as many as the number of antenna elements.

The multiplexer 126 multiplexes the demultiplex signals to which a weight is added, to generate a multiplex signal. The multiplex signal generated by the multiplexer 126 is a replica signal of the signal obtained by multiplexing signals transmitted from the respective antenna elements of the RRH 100 in wireless space. However, the multiplex signal obtained by multiplexing by the multiplexer 126 does not include a nonlinear distortion component because the multiplex signal has not passed through the power amplifiers per antenna element.

The coefficient update unit 127 performs update processing of the distortion compensation coefficient by comparing the multiplex signal generated by the multiplexer 126 and the multiplex FB signal output from the A/D converter 180. Specifically, the coefficient update unit 127 calculates a distortion compensation coefficient that minimizes a difference between the multiplex signal and the multiplex FB signal by using, for example, a least mean square (LMS) algorithm. The coefficient update unit 127 then causes the LUT 122 to store the calculated distortion compensation coefficient. As described above, the multiplex signal does not include a nonlinear distortion component, and the multiplex FB signal corresponds to a signal obtained by multiplexing in wireless space. Accordingly, by minimizing the difference between the multiplex signal and the multiplex FB signal, a distortion compensation coefficient that reduces a nonlinear distortion component included in the signal obtained by multiplexing in wireless space can be calculated.

Figure 3:
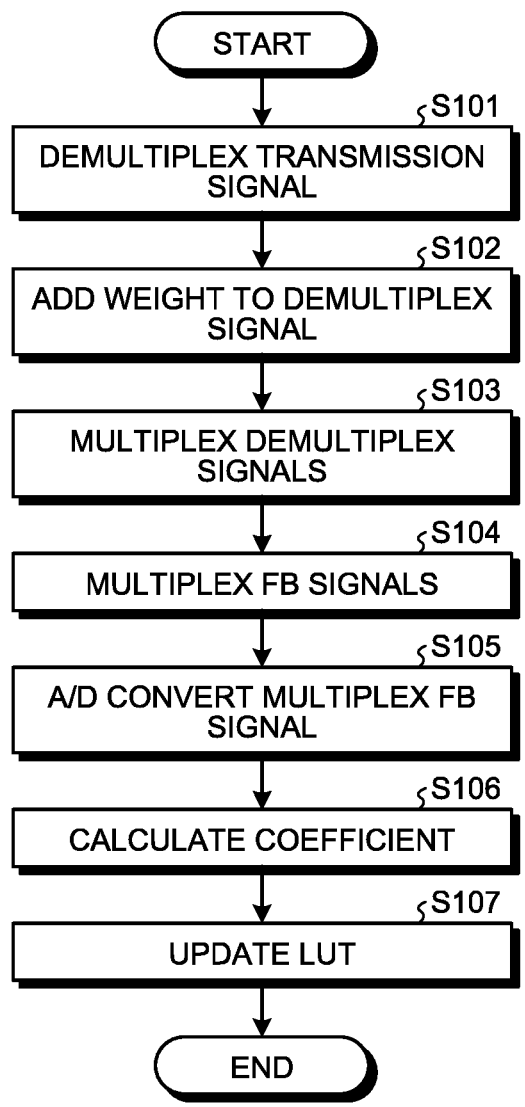
FIG. 3 is a flowchart illustrating a coefficient update method according to the first embodiment.

Subsequently, an update method of a distortion compensation coefficient in the RRH 100 configured as described above is described with reference to the flowchart illustrated in FIG. 3.

The transmission baseband signal transmitted from the BBU 10 is received by the communication I/F unit 110, to be input to the processor 120. The transmission baseband signal is demultiplexed into demultiplex signals as many as the number of the antenna elements of the RRH 100 by the demultiplexer 124 (step S101). To each of the demultiplex signals, a weight equivalent to an antenna weight added by the weight adding unit 160 for beamforming is added by the weight adding unit 125 (step S102). Subsequently, the demultiplex signals to which the weight is added are multiplexed by the multiplexer 126 (step S103) The multiplex signal thus generated is a replica signal of a signal obtained by multiplexing signals transmitted from the antenna elements of the RRH 100 in wireless space. However, the multiplex signal does not include a nonlinear distortion component because the demultiplex signals never pass through the power amplifiers in the course of generation of the multiplex signal. Therefore, the multiplex signal is input to the coefficient update unit 127 as a reference signal of the coefficient update.

On the other hand, the transmission baseband signal is subjected to distortion compensation by the distortion compensating unit 123, and is demultiplexed into signals of the respective antenna elements by the demultiplexer 150 after D/A conversion and up conversion. A signal of each of the antenna elements is given an antenna weight for beamforming added by the weight adding unit 160, and is amplified by the power amplifier, and is then transmitted to wireless space. Moreover, the signal amplified by the power amplifier is fed back to the multiplexer 170.

The FB signals fed back from the respective antenna elements are multiplexed as they are by the multiplexer 170 (step S104). That is, the FB signals per antenna element are multiplexed by the multiplexer 170 without passing through circuits, such as a phase shifter and a down converter. Thus, the multiplex FB signal generated by the multiplexer 170 is to be a signal equivalent to a signal obtained by multiplexing signals transmitted from the antenna elements in wireless space. Moreover, because the FB signals of the respective antenna elements pass through the respective power amplifiers, the multiplex FB signal includes a nonlinear distortion component that is not completely compensated by the distortion compensating unit 123.

The multiplex FB signal is down converted by the down converter, and is then A/D converted by the A/D converter 180 (step S105). Subsequently, the multiplex FB signal converted into a digital signal is input to the coefficient update unit 127 of the processor 120. Because the multiplex FB signal is thus fed back to the processor 120, the circuit scale of the feedback system is equivalent to a circuit that feeds back one signal. In other words, because a phase shifter, a down converter, an A/D converter, and the like corresponding to each of the FB signals of the respective antenna elements are not necessary, increase of the circuit scale can be suppressed.

When the multiplex signal and the multiplex FB signal are input to the coefficient update unit 127, a distortion compensation coefficient that minimizes a difference between the multiplex signal and the multiplex FB signal is calculated (step S106). Specifically, an update amount of a distortion compensation coefficient used for distortion compensation of the transmission baseband signal in the distortion compensating unit 123 is calculated, for example, by using the LMS algorithm, and this update amount is added to the distortion compensation coefficient. The distortion compensation coefficient thus calculated is a distortion compensation coefficient that reduces the nonlinear distortion component remaining in the signal obtained by multiplexing signals transmitted from the antenna elements in wireless space. Accordingly, the distortion compensation coefficient calculated by the coefficient update unit 127 replaces the distortion compensation coefficient stored in the LUT 122, and the LUT 122 is updated (step S107).

As described above, according to the present embodiment, signals amplified by power amplifiers of respective antenna elements are multiplexed, and a multiplex FB signal thus obtained is fed back to be compared with a multiplex signal generated from a transmission baseband signal, and a distortion compensation coefficient is updated based on a result of comparison. Therefore, it is not necessary to feed back a signal per antenna element separately, and a circuit of a feedback system is minimized, and increase of a circuit scale can be suppressed.

[b] Second Embodiment

A feature of a second embodiment is a point in which an address to read out a distortion compensation coefficient from the LUT is generated from a multiplex signal generated from a transmission baseband signal.

Configurations of a communication system and an RRH according to the second embodiment are similar to those of the first embodiment (FIGS. 1, 2), and description thereof is omitted. In the second embodiment, a configuration of the processor 120 of the RRH 100 is different from that of the first embodiment.

Figure 4:
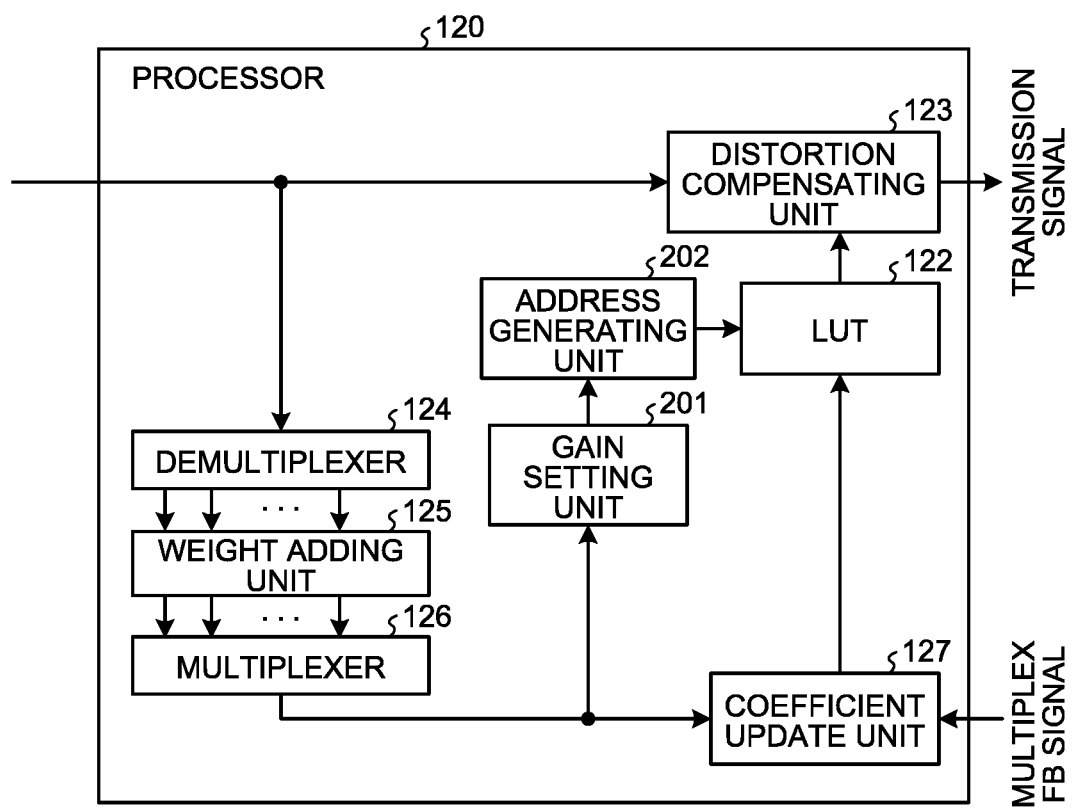
FIG. 4 is a block diagram illustrating a configuration of a processor according to a second embodiment.

FIG. 4 is a block diagram illustrating a configuration of the processor 120 according to the second embodiment. In FIG. 4, like reference symbols are given to like parts with FIG. 2, and description thereof is omitted. The processor 120 illustrated in FIG. 4 includes a gain setting unit 201 and an address generating unit 202 in place of the address generating unit 121 of the processor 120 illustrated in FIG. 2.

The gain setting unit 201 sets a gain according to a weight added to a demultiplex signal by the weight adding unit 125 to a multiplex signal output from the multiplexer 126. That is, because the dynamic range of a multiplex signal varies according to a weight added to a demultiplex signal by the weight adding unit 125, the gain setting unit 201 sets a gain to bring a power of the multiplex signal into a predetermined range.

The address generating unit 202 generates an address to read out a distortion compensation coefficient from the LUT 122 based on the power of a multiplex signal to which a gain is set. That is, the address generating unit 202 generates an address corresponding to the power of the multiplex signal, and output it to the LUT 122.

Figure 5:
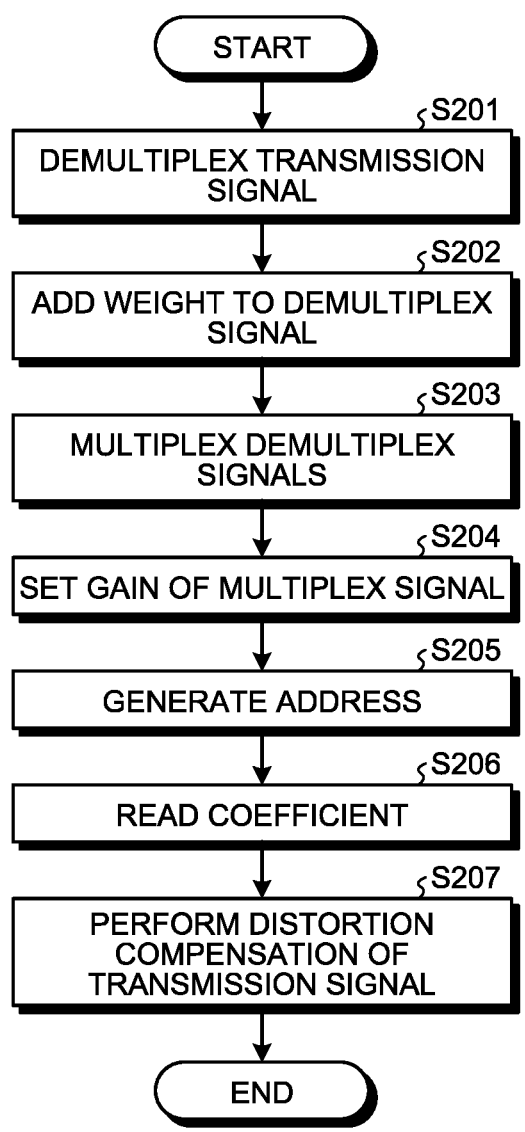
FIG. 5 is a flowchart illustrating a distortion compensation method according to the second embodiment.

Subsequently, a distortion compensation method in the RRH 100 configured as described above is described with reference to a flowchart illustrated in FIG. 5. The distortion compensation processing described in the following is performed mainly by the processor 120.

When a transmission baseband signal received from the BBU 10 is input to the processor 120, the transmission baseband signal is demultiplexed into demultiplex signals as many as the number of antenna elements of the RRH 100 by the demultiplexer 124 (step S201). To each of the demultiplex signals, a weight equivalent to an antenna weight added by the weight adding unit 160 for beamforming is added by the weight adding unit 125 (step S202). Subsequently, the demultiplex signals to which the weight is added are multiplexed by the multiplexer 126 (step S203).

The multiplex signal generated by multiplexing the demultiplex signals is output to the coefficient update unit 127 to be used for update of a distortion compensation coefficient. That is, similarly to the first embodiment, a distortion compensation coefficient stored in the LUT 122 is updated based on a result of comparison between a multiplex signal and a multiplex FB signal. Moreover, the multiplex signal is output also to the gain setting unit 201, and gain setting is performed (step S204). That is, the multiplex signal is multiplied by a gain to bring the dynamic range of the multiplex signal that varies as a result of weight addition by the weight adding unit 125 into a predetermined range. This enables to keep the power of the multiplex signal within a certain range by eliminating an influence of a weight even when the weight added to the demultiplex signal by the weight adding unit 125 changes, and to improve the accuracy in address generation.

The multiplex signal to which a gain is set by the gain setting unit 201 is output to the address generating unit 202, and an address is generated by the address generating unit 202 based on the power of the multiplex signal (step S205). The generated address is output to the LUT 122, and a distortion compensation coefficient stored at the address is read out from the LUT 122 (step S206). That is, the distortion compensation coefficient is output to the distortion compensating unit 123 from the LUT 122. Subsequently, the distortion compensating unit 123 multiplies the transmission baseband signal by the distortion compensation coefficient, thereby distortion compensation of the transmission signal is performed (step S207).

As described above, according to the present embodiment, an address is generated by using a multiplex signal to which a gain is set, and a distortion compensation coefficient stored at this address is read out from an LUT, thereby performing distortion compensation of a transmission signal. Moreover, a distortion compensation coefficient is updated based on a result of comparison between a multiplex signal and a multiplex FB signal. Therefore, also when an address is generated from a multiplex signal that is a reference signal of coefficient update, a circuit of a feedback system can be minimized, and increase of the circuit scale can be suppressed.

[c] Third Embodiment

A feature of a third embodiment is a point that a multiplex signal that is a reference signal of coefficient update is generated from a transmission signal that has been subjected to distortion compensation.

Configurations of a communication system and an RRH according to the third embodiment are similar to those of the first embodiment (FIGS. 1, 2), and description thereof is omitted. In the third embodiment, a configuration of the processor 120 of the RRH 100 is different from that of the first embodiment.

Figure 6:
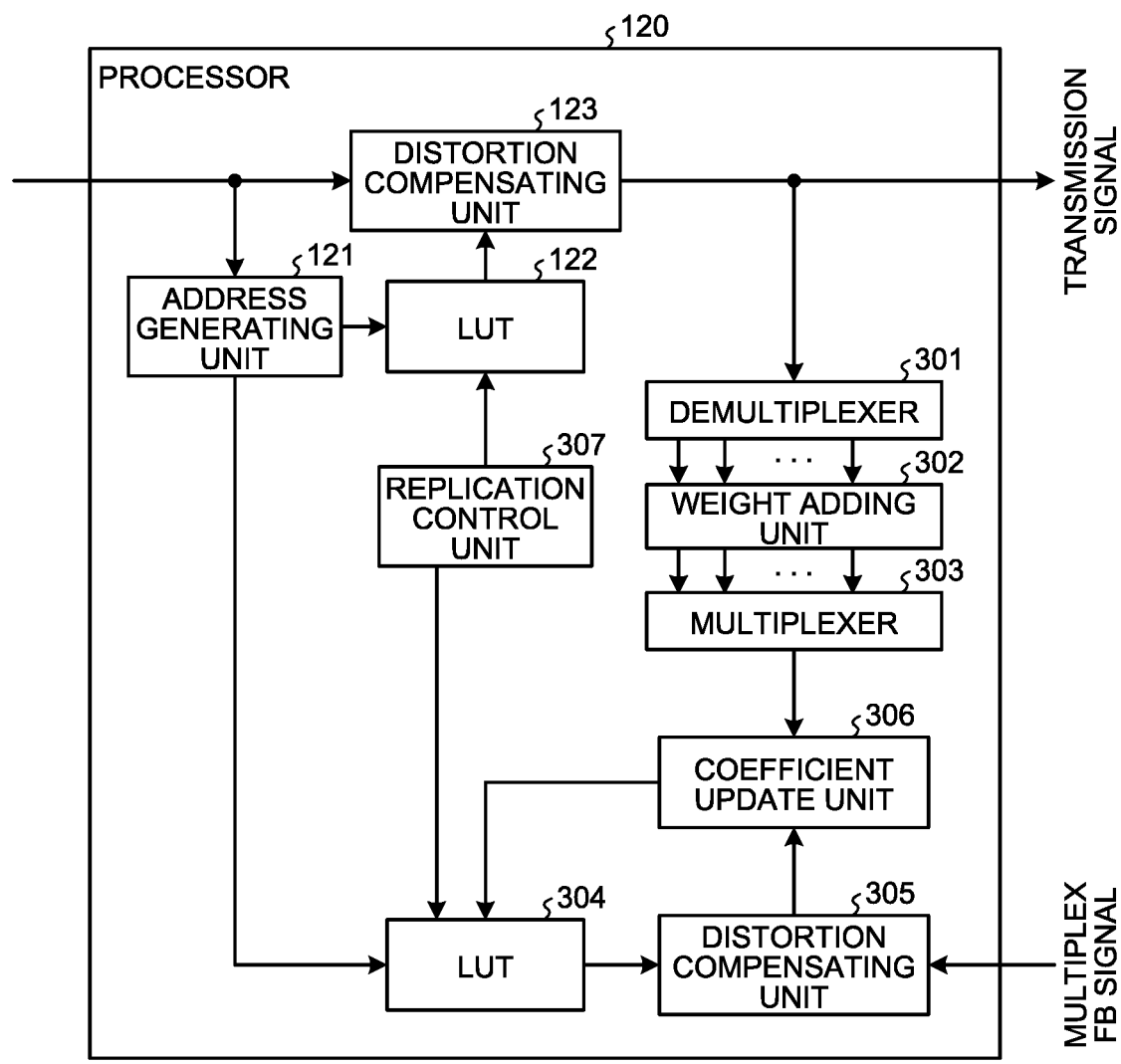
FIG. 6 is a block diagram illustrating a configuration of a processor according to a third embodiment.

FIG. 6 is a block diagram illustrating a configuration of the processor 120 according to the third embodiment. In FIG. 6, like reference symbols are given to like parts with FIG. 2, and description thereof is omitted. The processor 120 illustrated in FIG. 6 includes a demultiplexer 301, a weight adding unit 302, a multiplexer 303, an LUT 304, a distortion compensating unit 305, a coefficient update unit 306, and a replication control unit 307 in place of the demultiplexer 124, the weight adding unit 125, the multiplexer 126, and the coefficient update unit 127 of the processor 120 illustrated in FIG. 2.

The demultiplexer 301 demultiplexes a transmission baseband signal that has been subjected to distortion compensation by the distortion compensating unit 123, and generates demultiplex signals as many as the number of the antenna elements. That is, the demultiplexer 301 demultiplexes the transmission baseband signal that has been subjected to distortion compensation, similarly to demultiplexing by the demultiplexer 150.

The weight adding unit 302 adds an identical weight to an antenna weight per antenna element to each of the demultiplex signals output from the demultiplexer 301. That is, the weight adding unit 302 adds a weight equivalent to the antenna weight added by the weight adding unit 160 to each of the demultiplex signals as many as the number of the antenna elements.

The multiplexer 303 multiplexes the demultiplex signals to which a weight is added, to generate a multiplex signal. The multiplex signal generated by the multiplexer 303 is a replica signal of a signal obtained by multiplexing signals transmitted from the respective antenna elements of the RRH 100 in wireless space. However, the multiplex signal includes a distortion component from distortion compensation because the demultiplex signals multiplexed by the multiplexer 303 are subjected to the distortion compensation but have not passed through the power amplifier per antenna element.

The LUT 304 stores distortion compensation coefficients, associating with respective addresses. The distortion compensation coefficient stored in the LUT 304 corresponds to a nonlinear distortion component included in a signal obtained by multiplexing signals transmitted from the respective antenna elements in wireless space, similarly to the distortion compensation coefficient stored in the LUT 122. When an address is output from the address generating unit 121, the LUT 304 outputs the distortion compensation coefficient stored at this address to the distortion compensating unit 305.

The distortion compensating unit 305 multiplies the multiplex FB signal by the distortion compensation coefficient output from the LUT 304, thereby performing distortion compensation. That is, the distortion compensating unit 305 adds a distortion component by the distortion compensation to the multiplex FB signal equivalent to a signal obtained by multiplexing signals transmitted from the antenna elements in wireless space. The distortion compensating unit 305 outputs the multiplex FB signal that has been subjected to the distortion compensation to the coefficient update unit 306.

The coefficient update unit 306 performs update processing of the distortion compensation coefficient by comparing the multiplex signal generated by the multiplexer 303 and the multiplex FB signal output from the distortion compensating unit 305. Specifically, the coefficient update unit 306 calculates a distortion compensation coefficient that minimizes a difference between the multiplex signal and the multiplex FB signal by using, for example, the LMS algorithm. The coefficient update unit 306 then stores the calculated distortion compensation coefficient in the LUT 304. As described above, both the multiplex signal and the multiplex FB signal include a distortion component from distortion compensation, and the multiplex FB signal further includes a remaining nonlinear distortion component, not completely compensated by the distortion compensation processing. Therefore, by minimizing a difference between the multiplex signal and the multiplex FB signal, a distortion compensation coefficient that reduces a nonlinear distortion component included in a signal obtained by multiplexing in wireless space can be calculated.

The replication control unit 307 replicates contents of the LUT 304 into the LUT 122 in every predetermined period. That is, the replication control unit 307 replicates distortion compensation coefficients updated by the coefficient update unit 306 from the LUT 304 in the LUT 122.

Figure 7:
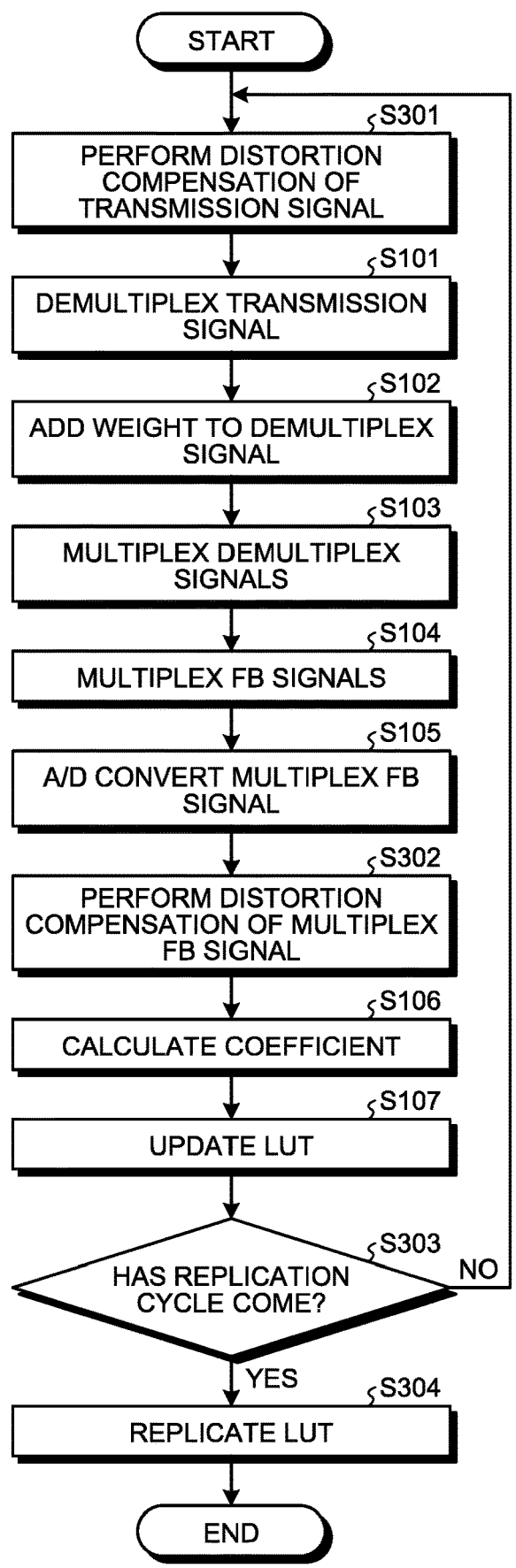
FIG. 7 is a flowchart illustrating a coefficient update method according to the third embodiment.

Subsequently, an update method of a distortion compensation coefficient in the RRH 100 configured as described above is described with reference to a flowchart illustrated in FIG. 7. In FIG. 7, like reference symbols are given to like parts with FIG. 3, and detailed description thereof is omitted. Coefficient update processing described in the following is mainly performed by the processor 120.

When a transmission baseband signal received from the BBU 10 is input to the processor 120, the transmission baseband signal is subjected to distortion compensation processing by the distortion compensating unit 123 (step S301). For this distortion compensation processing, a distortion compensation coefficient stored in the LUT 122 is used.

The transmission baseband signal that has been subjected to the distortion compensation processing is demultiplexed into demultiplex signals as many as the number of the antenna elements of the RRH 100 by the demultiplexer 301 (step S101). To each of the demultiplex signals, a weight equivalent to an antenna weight added by the weight adding unit 160 for beamforming is added by the weight adding unit 302 (step S102). Subsequently, the multiplexer 303 multiplexes the demultiplex signals to which the weight is added (step S103). The multiplex signal generated by the multiplexer 303 is input to the coefficient update unit 306 as a reference signal of coefficient update.

On the other hand, FB signals fed back from the respective antenna elements are multiplexed as they are by the multiplexer 170 (step S104). The multiplex FB signal is down converted by the down converter, and then A/D converted by the A/D converter 180 (step S105). The multiplex FB signal converted into a digital signal is subjected to distortion compensation processing by the distortion compensating unit 305 of the processor 120 (step S302). For this distortion compensation processing, a distortion compensation coefficient stored in the LUT 304 is used. The multiplex FB signal that has been subjected to the distortion compensation processing is input to the coefficient update unit 306.

When the multiplex signal and the multiplex FB signal are input to the coefficient update unit 306, a distortion compensation coefficient that minimizes a difference between the multiplex signal and the multiplex FB signal is calculated (step S106). With the distortion compensation coefficient calculated by the coefficient update unit 306, a distortion compensation coefficient stored in the LUT 304 is replaced, thereby updating the LUT 304 (step S107). During when the update of the distortion compensation coefficient stored in the LUT 304 is performed while the distortion compensation of a transmission signal is performed by the distortion compensation coefficient stored in the LUT 122 as described, the replication control unit 307 monitors whether time to replicate the LUT has come (step S303). That is, it is determined whether a predetermined period for replication of contents of the LUT 304 in the LUT 122 has elapsed.

When it is determined that the predetermined period has not elapsed as a result of the determination (step S303: NO), distortion compensation of a transmission signal by using a distortion compensation coefficient of the LUT 122 and update of a distortion compensation coefficient of the LUT 304 are repeated (step S301 to S107). When the predetermined period has elapsed (step S303: YES), the distortion compensation coefficients stored in the LUT 304 are replicated in the LUT 122 (step S304). Thus, the distortion compensation coefficient of the LUT 122 used for distortion compensation of a transmission signal is updated. By thus storing distortion compensation coefficients used for distortion compensation of transmission signals and updated distortion compensation coefficients in different LUTs, time until a value of a distortion compensation coefficient converges can be shortened in the update processing.

As described, according to the present embodiment, a multiplex signal generated from a transmission baseband signal subjected distortion compensation and a multiplex FB signal subjected to distortion compensation are compared, and a distortion compensation coefficient is updated based on a result of comparison. Therefore, also when a distortion coefficient is updated by using a signal that has been subjected to distortion compensation, increase of the circuit scale can be suppressed. Moreover, because different LUTs are used for distortion compensation processing of a transmission baseband signal and for update processing of a distortion compensation coefficient, time until a value of a distortion compensation coefficient converges can be shortened.

[d] Fourth Embodiment

A feature of a fourth embodiment is a point that a level of a multiplex FB signal is adjusted based on a signal level of a multiplex signal that is a reference signal of coefficient update.

A configuration of a communication system according to the fourth embodiment is similar to that of the first embodiment (FIG. 1), description thereof is omitted. In the fourth embodiment, a configuration of the RRH 100 is different from that of the first embodiment.

Figure 8:
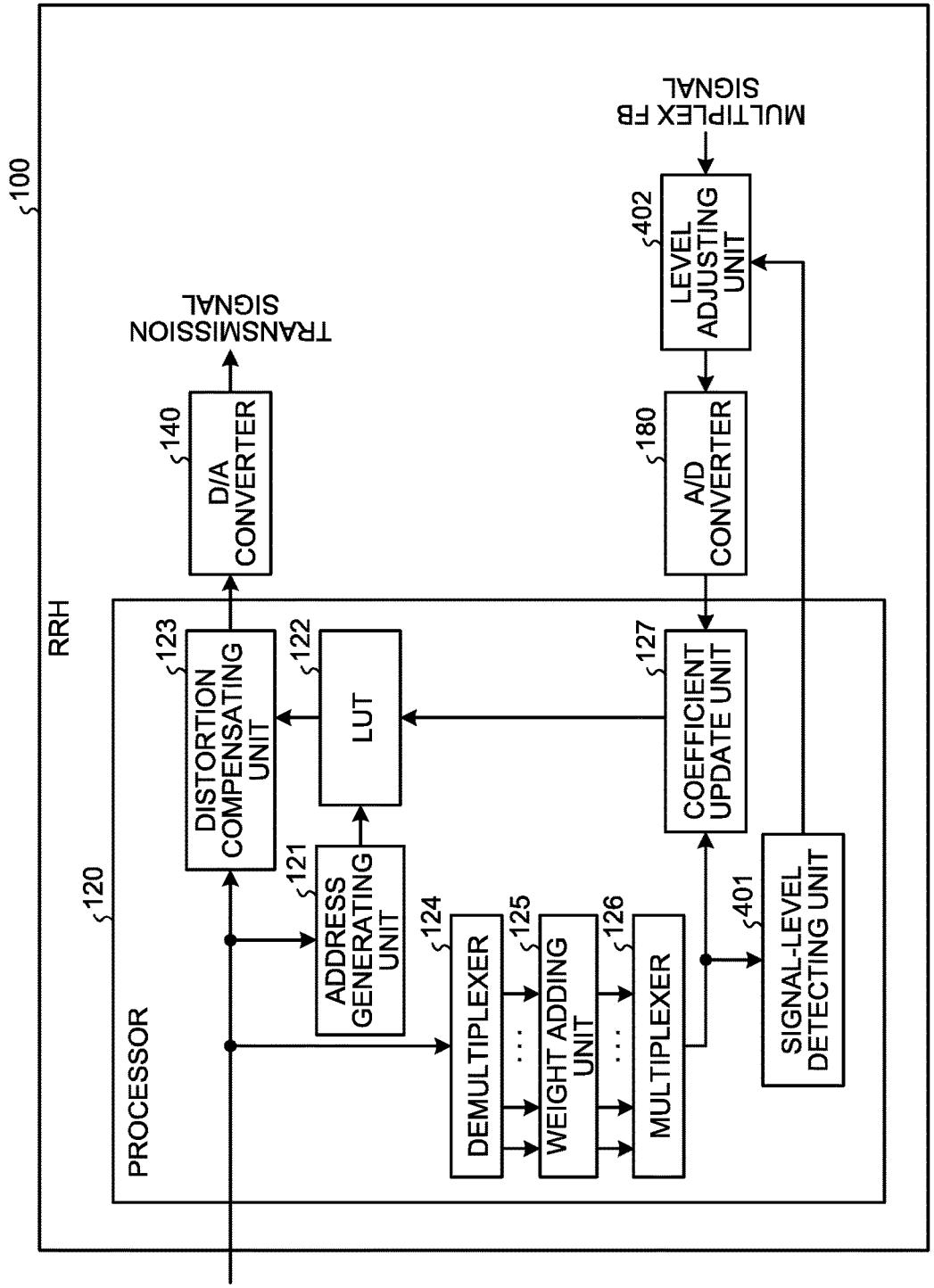
FIG. 8 is a block diagram illustrating a configuration of a principal part of an RRH according to a fourth embodiment.

FIG. 8 is a block diagram illustrating a configuration of a principal part of the RRH 100 according to the fourth embodiment. In FIG. 8, illustration of like parts with FIG. 2 is omitted, or like reference symbols to FIG. 2 are given thereto, and description thereof is omitted. The RRH 100 illustrated in FIG. 8 has a configuration in which a signal-level detecting unit 401 and a level adjusting unit 402 are added to the RRH 100 illustrated in FIG. 2.

The signal level detecting unit 401 detects a signal level of a multiplex signal output from the multiplexer 126, and detects a maximum amplitude within a predetermine period. The signal-level detecting unit 401 then instructs gain adjustment according to the detected maximum amplitude to the level adjusting unit 402. Specifically, the signal-level detecting unit 401 determines a gain to make the maximum amplitude conform to the dynamic range of the A/D converter 180, and specifies the determined gain to the level adjusting unit 402.

The level adjusting unit 402 adjusts the gain of the multiplex FB signal according to the instruction from the signal-level detecting unit 401. That is, the level adjusting unit 402 multiplies the multiplex FB signal by the gain specified by the signal-level detecting unit 401. Thus, the signal level of the multiplex FB signal is to be conform to the dynamic range of the A/D converter 180, and it is possible to use the most out of the resolution of the A/D converter 180.

As described above, according to the present embodiment, the gain of a multiplex FB signal is adjusted according to a maximum amplitude of a multiplex signal, and the multiplex FB signal, the gain of which is adjusted is A/D converted. Therefore, the signal level of the multiplex FB signal can be adjusted to meet the dynamic range of an A/D converter, and it is possible to use the most out of the resolution of the A/D converter. As a result, the accuracy of the multiplex FB signal used for the coefficient update can be improved, and the update of a distortion compensation coefficient can be performed efficiently.

The signal-level detecting unit 401 is configured to detect a signal level of a multiplex signal in the fourth embodiment described above, but the signal-level detecting unit 401 may detect a signal level of a multiplex FB signal that is input to the processor 120 from the A/D converter 180, and detect a maximum amplitude of the multiplex FB signal. In this case, the signal-level detecting unit 401 instructs gain adjustment according to the maximum amplitude of the multiplex FB signal to the level adjusting unit 402.

[e] Fifth Embodiment

A feature of a fifth embodiment is a point that a distortion compensation coefficient is calculated, when a distortion compensation coefficient that has been calculated by using a multiplex signal and a multiplex FB signal corresponding to all the antenna elements does not satisfy predetermined quality, by using a partial multiplex signal and a partial multiplex FB signal corresponding to part of the antenna elements.

A configuration of a communication system according to the fifth embodiment is similar to that of the first embodiment (FIG. 1), and description thereof is omitted. In the fifth embodiment, a configuration of the RRH 100 is different from that of the first embodiment.

Figure 9:
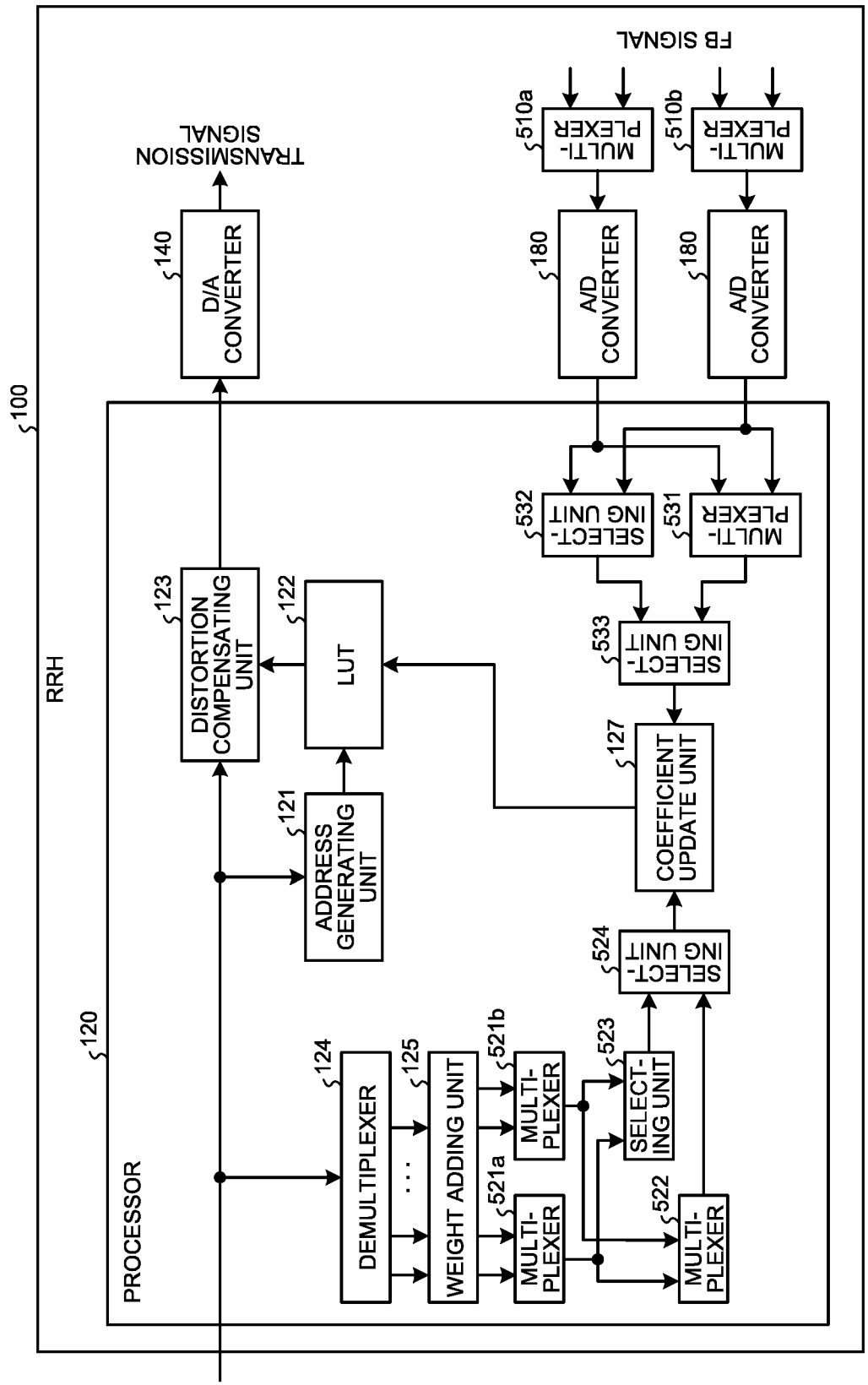
FIG. 9 is a block diagram illustrating a principal part of an RRH according to a fifth embodiment.

FIG. 9 is a block diagram illustrating a configuration of a principal part of the RRH 100 according to the fifth embodiment. In FIG. 9, illustration of like parts with FIG. 2 is omitted, or like reference symbols to FIG. 2 are given thereto, and description thereof is omitted. The RRH 100 illustrated in FIG. 9 has a configuration that includes multiplexers 521a, 521b, and 522, and multiplexers 510a, 510b, and 531 in place of the multiplexer 126 and the multiplexer 170 in the RRH 100 illustrated in FIG. 2, and in which a selecting units 523, 524, 532, and 533 are added.

The multiplexers 510a and 510b multiplex FB signals from part of antenna elements out of the plural antenna elements, and feed back to the processor 120. That is, the multiplexers 510a and 510b respectively multiplex FB signals that are fed back from part of the antenna elements, and generate a partial multiplex FB signal. The multiplexers 510a and 510b multiplex predetermined different number of FB signals from each other out of plural FB signals. These partial multiplex FB signals are A/D converted by the A/D converter 180 corresponding to each.

The corresponding to each multiplexers 521a and 521b respectively multiplex part of demultiplex signals to which a weight is added, to generate a partial multiplex signal. The multiplexers 521a and 521b multiplex demultiplex signals corresponding to the multiplexing by the multiplexers 510a and 510b. That is, for example, the multiplexer 521a multiplexes demultiplex signals corresponding to the FB signal multiplexed by the multiplexer 510a, and the multiplexer 521b multiplex demultiplex signals corresponding to the FB signal multiplexed by the multiplexer 510b.

The multiplexer 522 multiplexes partial multiplex signal obtained by multiplexing by the multiplexers 521a and 521b, to generate an entire multiplex signal. The entire multiplex signal is equivalent to a multiplex signal that is generated by the multiplexer 126 according to the first embodiment. The multiplexer 522 outputs the entire multiplex signal to the selecting unit 524.

The selecting unit 523 selects either one of the partial multiplex signals output from the multiplexers 521a and 521b. Specifically, the selecting unit 523 selects one of the partial multiplex signals in an initial state, and when quality of the distortion compensation does not satisfy a predetermined standard as a result of performing the coefficient update processing by using this partial multiplex signal, selects the other one of the partial multiplex signals. The selecting unit 523 outputs the selected partial multiplex signal to the selecting unit 524.

The selecting unit 524 selects either one of the entire multiplex signals and the partial multiplex signal. Specifically, the selecting unit 524 selects the entire multiplex signal in an initial state, and when quality of distortion compensation does not satisfy a predetermined standard as a result of performing the coefficient update processing by using the entire multiplex signal, selects the partial multiplex signal. The selecting unit 524 outputs the selected entire multiplex signal or partial multiplex signal to the coefficient update unit 127.

The multiplexer 531 multiplexes the partial multiplex FB signals that are obtained by multiplexing by the multiplexers 510a and 510b, to generate an entire multiplex FB signal. The entire multiplex FB signal is equivalent to a multiplex FB signal that is input to the coefficient update unit 127 according to the first embodiment. The multiplexer 531 outputs the entire multiplex FB signal to the selecting unit 533.

The selecting unit 532 selects either one of the partial multiplex FB signals generated by the multiplexers 510a and 510b. Specifically, the selecting unit 532 selects one of the partial FB multiplex signals in an initial state, and when quality of the distortion compensation does not satisfy a predetermined standard as a result of performing the coefficient update processing by using this partial multiplex FB signal, selects the other one of the partial multiplex FB signals. The selecting unit 532 outputs the selected partial multiplex FB signal to the selecting unit 533.

The selecting unit 533 selects either one of the entire multiplex FB signal and the partial multiplex FB signal. Specifically, the selecting unit 533 selects the entire multiplex signal in an initial state, and when quality of distortion compensation does not satisfy a predetermined standard as a result of performing the coefficient update processing by using the entire multiplex FB signal, selects the partial multiplex FB signal. The selecting unit 533 outputs the selected entire multiplex FB signal or partial multiplex FB signal to the coefficient update unit 127.

Figure 10:
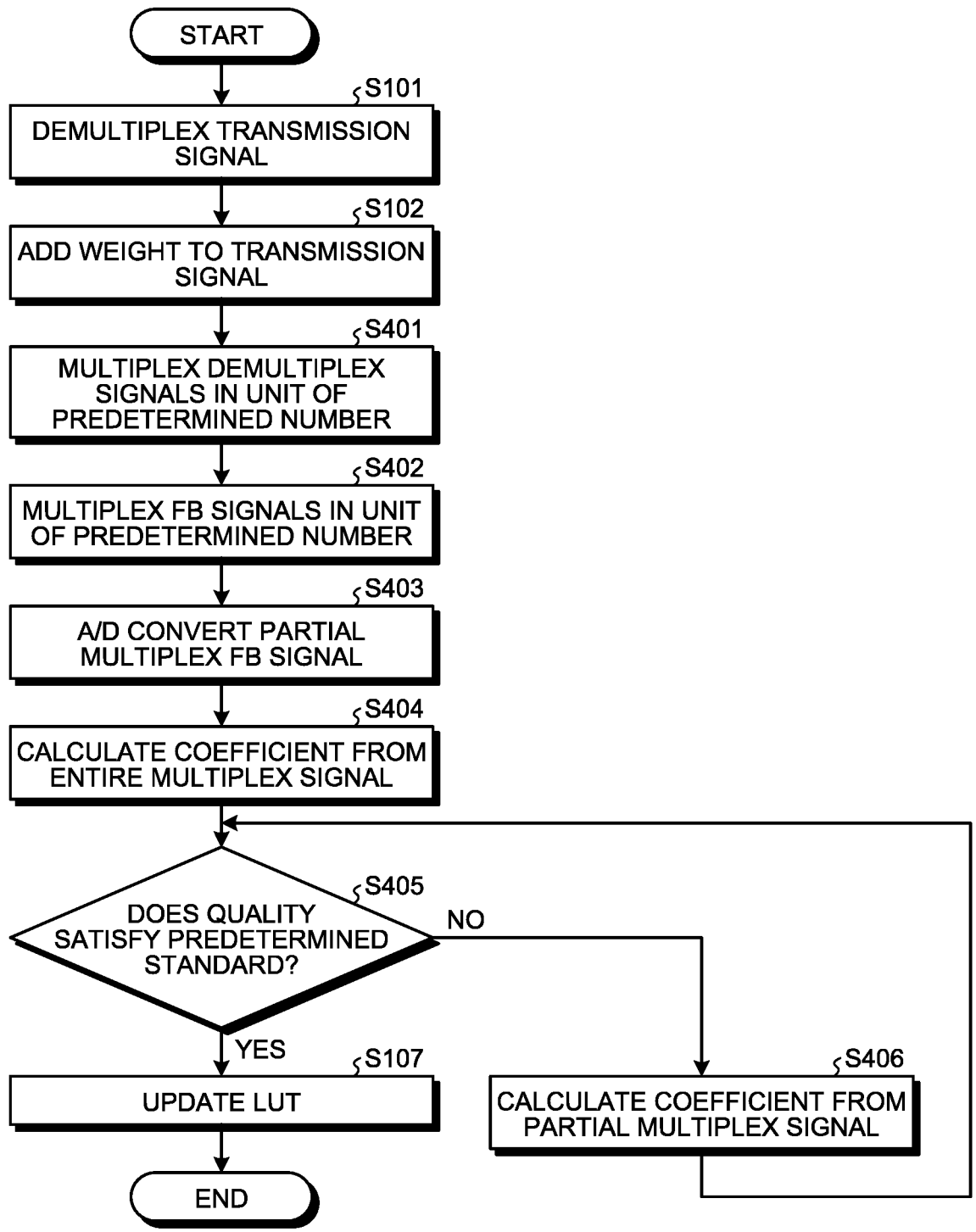
FIG. 10 is a flowchart illustrating a coefficient update method according to the fifth embodiment.

Subsequently, an update method of a distortion compensation coefficient in the RRH 100 configured as described above is described with reference to a flowchart illustrated in FIG. 10. In FIG. 10, like reference symbols are given to like parts with FIG. 3, and detailed description thereof is omitted.

When a transmission baseband signal received from the BBU 10 is input to the processor 120, the transmission baseband signal is demultiplexed into demultiplex signals as many as the number of the antenna elements of the RRH 100 by the demultiplexer 124 (step S101). To each of the demultiplex signals, a weight equivalent to an antenna weight added by the weight adding unit 160 for beamforming is added by the weight adding unit 125 (step S102). Furthermore, the multiplexers 521a and 521b multiplex the demultiplex signals to which a weight is added in a unit of predetermined number of signals (step S401). The partial multiplex signals that generated by the respective multiplexers 521a and 521b are further multiplexed by the multiplexer 522, to be generated into an entire multiplex signal. The entire multiplex signal is equivalent to a multiplex signal generated by the multiplexer 126 according to the first embodiment.

On the other hand, FB signals fed back from the respective antenna elements are multiplexed in a unit of a predetermined number of signals by the multiplexers 510a and 510b (step S402). At this time, the multiplexers 510a and 510b multiplex FB signals that correspond respectively to the demultiplex signals that are multiplexed by the multiplexers 521a and 521b. That is, for example, the multiplexer 510a multiplexes FB signals corresponding to the demultiplex signals that are multiplexed by the multiplexer 521a, and the multiplexer 510b multiplexes FB signals corresponding to the demultiplex signals that are multiplexed by the multiplexer 521b.

The partial multiplex FB signals generated by the respective multiplexers 510a and 510b are down converted by the down converter, and are then A/D converted by the A/D converter 180 (step S403). Subsequently, the partial multiplex FB signals converted into digital signals are further multiplexed by the multiplexer 531 to be generated into an entire multiplex FB signal. The entire multiplex FB signal is equivalent to a multiplex FB signal that is input to the coefficient update unit 127 according to the first embodiment.

When the partial multiplex signals, the entire multiplex signal, the partial multiplex FB signals, and the entire multiplex FB signal are generated as described, the entire multiplex signal and the entire multiplex FB signal are first used to calculate a distortion compensation coefficient (step S404). Specifically, the entire multiplex signal generated by the multiplexer 522 is selected by the selecting unit 524, and the entire multiplex FB signal generated by the multiplexer 531 is selected by the selecting unit 533, to be input to the coefficient update unit 127. Subsequently, a distortion compensation coefficient that minimizes a difference between the entire multiplex signal and the entire multiplex FB signal is calculated by the coefficient update unit 127 by using, for example, the LMS algorithm.

The calculated distortion compensation coefficient is temporarily stored in the LUT 122, and quality of distortion compensation performed thereafter using the distortion compensation coefficient that is temporarily stored is monitored by the selecting units 523, 524, 532, and 533. That is, it is determined whether a value of a distortion compensation coefficient converges when the update processing of the distortion compensation coefficient using the entire multiplex signal and the entire multiplex FB signal is repeated, thereby determining whether the quality of distortion compensation satisfies a predetermined standard (step S405). In this determination, for example, when the value of the distortion compensation coefficient converges, it is determined that the quality of distortion compensation satisfies the predetermined standard (step S405: YES). In this case, the distortion compensation coefficient temporarily stored in the LUT 122 is stored as a final distortion compensation coefficient, and the LUT 122 is thus updated (step S107). Furthermore, the selecting units 524 and 533 continue to select an entire multiplex signal and an entire multiplex FB signal, and coefficient update processing by using the entire multiplex signal and the entire multiplex FB signal is continued.

On the other hand, in the determination at step S405, for example, when the value of the distortion compensation coefficient does not converge, it is determined that the quality of distortion compensation does not satisfy the predetermined standard (step S405: NO). Cases of being determined as such include, for example, a case in which by adding a weight, phases of a demultiplex signal and an FB signal are canceled, and the amplitudes of the entire multiplex signal and the entire multiplex FB signal are to be 0. In such a case, a partial multiplex signal generated by either one of the multiplexers 521a and 521b is selected by the selecting unit 523, and this partial multiplex signal is selected by the selecting unit 524. Moreover, a partial multiplex FB signal generated by either one of the multiplexers 510a and 510b is selected by the selecting unit 532, and this partial multiplex FB signal is selected by the selecting unit 533. Note that the selected partial multiplex signal and partial multiplex FB signal are signals that are obtained by multiplexing partial signals and partial FB signals corresponding to the same group of antenna elements. Subsequently, a distortion compensation coefficient that minimizes a difference between the selected partial multiplex signal and partial multiplex FB signal is calculated by the coefficient update unit 127 by using, for example, the LMS algorithm (step S406).

The calculated distortion compensation coefficient is temporarily stored in the LUT 122, and quality of distortion compensation performed thereafter using the distortion compensation coefficient that is temporarily stored is monitored by the selecting units 523, 524, 532, and 533. That is, it is determined whether the quality of distortion compensation satisfies a predetermined standard when the update processing of the distortion compensation coefficient using the selected partial multiplex signal and partial multiplex FB signal is repeated (step S405). In this determination, when it is determined that the quality of distortion compensation satisfies the predetermined standard (step S405: YES), the distortion compensation coefficient temporarily stored in the LUT 122 is stored as a final distortion compensation coefficient, and the LUT 122 is thus updated (step S107). Furthermore, the selecting units 523, 524, 532, and 533 continue to select the partial multiplex signal and the partial multiplex FB signal being selected, and coefficient update processing by using the partial multiplex signal and the partial multiplex FB signal is continued.

When it is determined that the quality of distortion compensation does not satisfy the predetermined standard even with the partial multiplex signal and the partial multiplex FB signal at step S405 (step S405: NO), a partial multiplex signal and a partial multiplex FB signal that have not been selected are newly selected by the selecting units 523 and 532. Moreover, the newly selected partial multiplex signal and partial multiplex FB signal are selected by the selecting units 524 and 533. The partial multiplex signal and the partial multiplex FB signal selected herein are also signals that are obtained by multiplexing demultiplex signals or FB signals corresponding to the same group of antenna elements. Subsequently, a distortion compensation coefficient that minimizes a difference between the selected partial multiplex signal and partial multiplex FB signal is calculated in a similar manner (step S406).

As described above, according to the present embodiment, when quality of distortion compensation using an entire multiplex signal and an entire multiplex FB signal corresponding to all of antenna elements is not preferable, a distortion compensation coefficient is updated by using a partial multiplex signal and a partial multiplex FB signal corresponding to part of the antenna elements. Therefore, for example, even when the amplitudes of an entire multiplex signal and an entire multiplex FB signal become 0 as a result of weight addition, a distortion compensation coefficient can be updated.

In the fifth embodiment described above, it is configured to generate two each of partial multiplex signals and partial multiplex FB signals, but three or more partial multiplex signals and partial multiplex FB signals may be generated. It is noted that also when three or more partial multiplex signals and partial multiplex FB signals are generated, demultiplex signals constituting the partial multiplex signal and FB signals constituting the partial multiplex FB signal are signals corresponding to the same group of antenna elements.

Moreover, when a partial multiplex signal and a partial multiplex FB signal are generated, demultiplex signals or FB signals corresponding to a group of antenna elements adjacent to each other may be multiplexed. The aligned plural antenna elements may be grouped from outside or from inside, and demultiplex signals or FB signals in each group may be multiplexed.

[f] Sixth Embodiment

A feature of a sixth embodiment is a point that an inverse weight to an antenna weight is added to a multiplex FB signal, and a distortion compensation coefficient is updated based on comparison with a transmission baseband signal.

Configurations of a communication system and an RRH according to the sixth embodiment are similar to those of the first embodiment (FIGS. 1, 2), and description thereof is omitted. In the sixth embodiment, a configuration of the processor 120 of the RRH 100 is different from that of the first embodiment.

Figure 11:
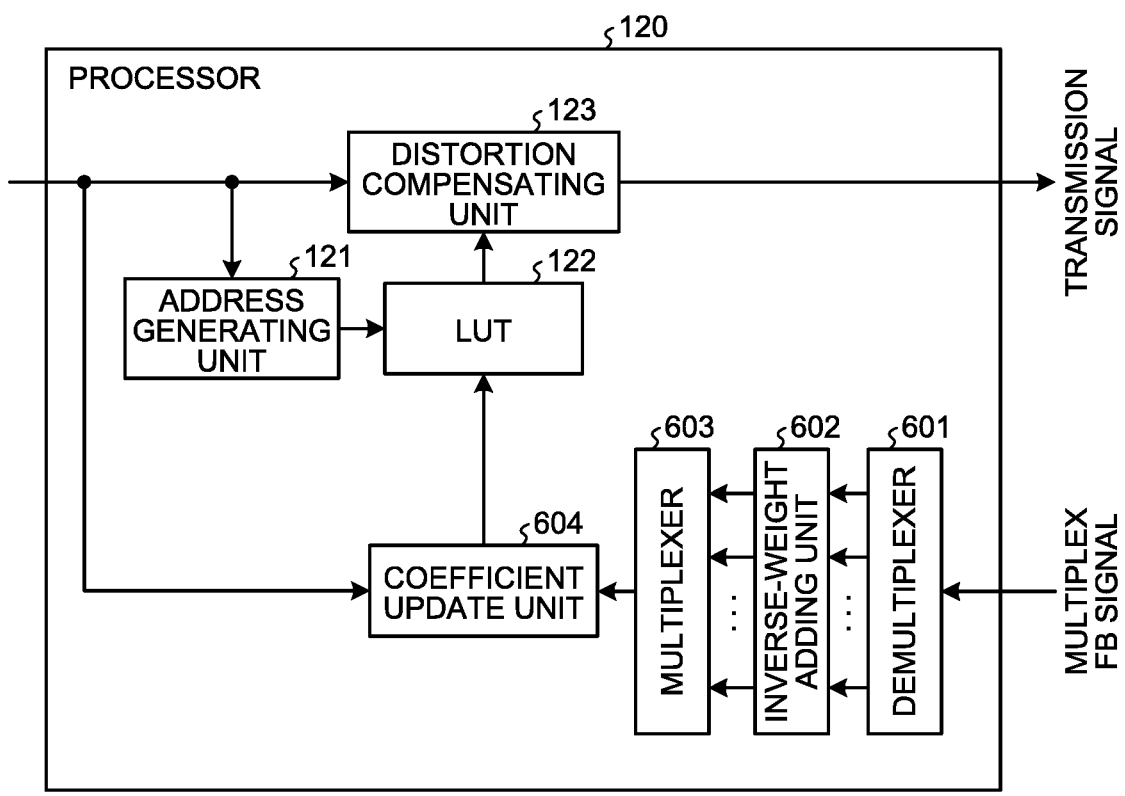
FIG. 11 is a block diagram illustrating a configuration of a processor according to a sixth embodiment.

FIG. 11 is a block diagram illustrating a configuration of the processor 120 according to the sixth embodiment. In FIG. 11, like reference symbols are given to like parts with FIG. 2, and description thereof is omitted. The processor 120 illustrated in FIG. 11 includes a demultiplexer 601, an inverse-weight adding unit 602, a multiplexer 603, and a coefficient update unit 604 in place of the demultiplexer 124, the weight adding unit 125, the multiplexer 126, and the coefficient update unit 127 of the processor 120 illustrated in FIG. 2.

The demultiplexer 601 demultiplexes a multiplex FB signal, and generates demultiplex FB signals as many as the number of the antenna elements. That is, the demultiplexer 601 demultiplexes the multiplex FB signal, similarly to demultiplexing by the demultiplexer 150.

The inverse-weight adding unit 602 adds an inverse weight to an antenna weight per antenna element (hereinafter, "inverse weight") to each of the demultiplex FB signals output from the demultiplexer 601. That is, the inverse-weight adding unit 602 adds an inverse weight that cancels the antenna weight added by the weight adding unit 160, to each of the demultiplex FB signals as many as the number of the antenna elements.

The multiplexer 603 multiplexes the demultiplex FB signals to which the inverse weight is added, to generate an inverse-weight FB signal. The inverse-weight FB signal generated by the multiplexer 603 is a signal in which an antenna weight per antenna element is cancelled. The inverse-weight FB signal includes a remaining nonlinear distortion component that is not completely compensated by the distortion compensating unit 123.

The coefficient update unit 604 performs update processing of a distortion compensation coefficient by comparing a transmission baseband signal and the inverse-weight FB signal output from the multiplexer 603. Specifically, the coefficient update unit 604 calculates a distortion compensation coefficient that minimizes a difference between the transmission baseband signal and the inverse-weight FB signal by using, for example, the LMS algorithm. The coefficient update unit 604 then stores the calculated distortion compensation coefficient in the LUT 122. As described above, because the inverse-weight FB signal is a signal in which the antenna weight is cancelled, comparison of the transmission baseband signal and the inverse-weight FB signal is possible, and by minimizing a difference between these two, a distortion compensation coefficient that reduces a nonlinear distortion component remaining in the inverse-weight FB signal can be calculated.

Figure 12:
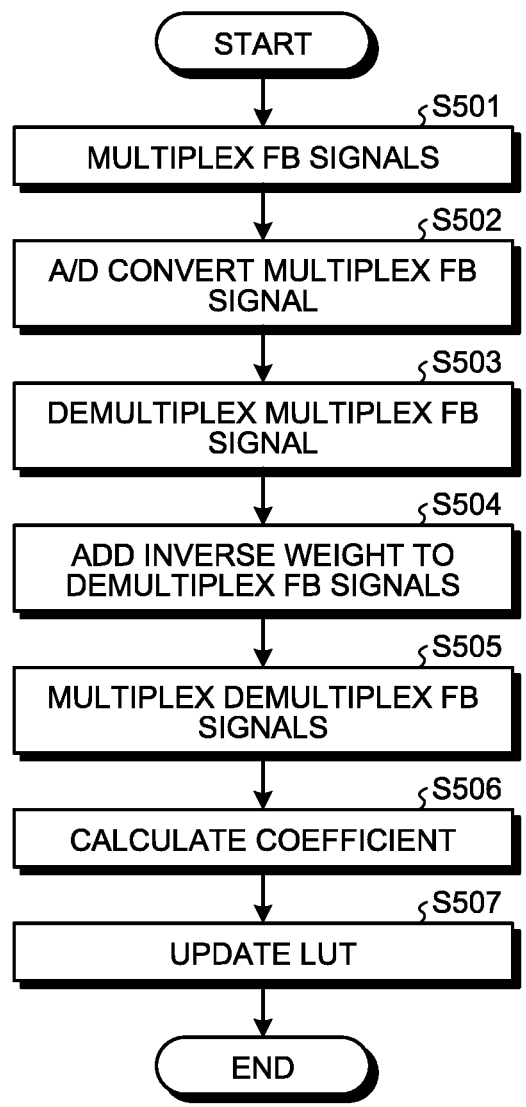
FIG. 12 is a flowchart illustrating a coefficient update method according to the sixth embodiment.

Subsequently, an update method of a distortion compensation coefficient in the RRH 100 configured as described above is described with reference to a flowchart illustrated in FIG. 12. Coefficient update processing described in the following is mainly performed by the processor 120.

When a transmission baseband signal received from the BBU 10 is input to the processor 120, the transmission baseband signal is subjected to distortion compensation processing by the distortion compensating unit 123, and is input to the coefficient update unit 604 as a reference signal of coefficient update. The transmission signal that has been subjected to the distortion compensation is given an antenna weight of each of antenna elements, amplified by the power amplifier, and then transmitted from each antenna element.

Moreover, the signal output from the power amplifier of each antenna element is fed back to the multiplexer 170, and plural FB signals are multiplexed (step S501). The multiplex FB signal is down converted by the down converter, and then A/D converted by the A/D converter 180 (step S502). The multiplex FB signal converted into a digital signal is demultiplexed into demultiplex FB signals as many as the number of antenna elements of the RRH 100 by the demultiplexer 601 of the processor 120 (step S503). To each of the demultiplex FB signals, an inverse weight to an antenna weight of each antenna element is added by the inverse-weight adding unit 602 (step S504). The multiplexer 603 multiplexes demultiplex FB signals to which the inverse weight is added (step S505), to generate an inverse-weight FB signal. The inverse-weight FB signal is input to the coefficient update unit 604.

When the transmission baseband signal and the inverse-weight FB signal are input to the coefficient update unit 604, a distortion compensation coefficient that minimizes a difference between the transmission baseband signal and the inverse-weight FB signal is calculated (step S506). With the distortion compensation coefficient calculated by the coefficient update unit 604, a distortion compensation coefficient stored in the LUT 122 is replaced, thereby updating the LUT 122 (step S507).

AS described above, according to the present embodiment, an inverse-weight FB signal in which an antenna weight is cancelled is generated from a multiplex FB signal, and a distortion compensation coefficient is updated based on a result of comparison between a transmission baseband signal and the inverse-weight FB signal. Accordingly, it is not necessary to feed back a signal per antenna element separately, and a circuit of a feedback system is minimized, and increase of a circuit scale can be suppressed.

[g] Seventh Embodiment

In the first to the sixth embodiments described above, the power amplifiers arranged in the respective antenna elements are collectively subjected to the digital predistortion. In other words, distortion compensation using a single distortion compensation coefficient is performed with respect to plural power amplifiers. However, characteristics of plural power amplifiers are not uniform in a strict sense, and there are individual differences. Because the characteristics of the power amplifiers varies, a difference is generated between an FB signal and a multiplex FB signal, for example, depending on a direction of a directional beam formed by beamforming, and the distortion compensation performance can be reduced.

For this reason, in the seventh embodiment, a case in which reduction in the distortion compensation performance is suppressed by adding a pseudo distortion corresponding to a variation of characteristics of the power amplifier of each antenna element to a demultiplex signal is described.

A configuration of a communication system according to the seventh embodiment is similar to that of the first embodiment (FIG. 1), description thereof is omitted. In the seventh embodiment, a configuration of the RRH 100 is different from that of the first embodiment.

Figure 13:
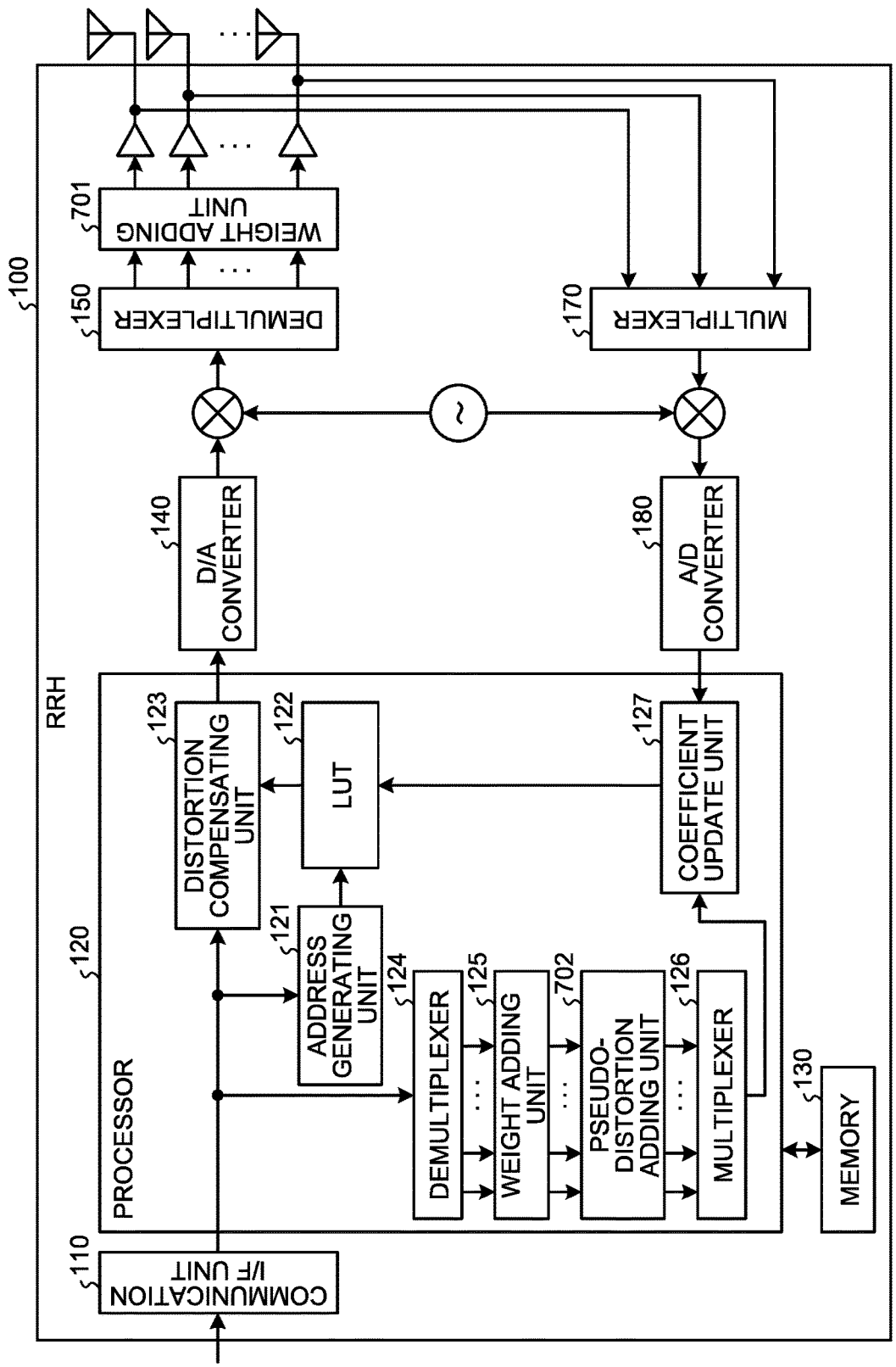
FIG. 13 is a block diagram illustrating a configuration of an RRH according to a seventh embodiment.

FIG. 13 is a block diagram illustrating a configuration of the RRH 100 according to the seventh embodiment. In FIG. 13, like reference symbols are given to like parts with FIG. 2, and description thereof is omitted. The RRH 100 illustrated in FIG. 13 has a configuration that includes a weight adding unit 701 in place of the weight adding unit 160, and in which a pseudo-distortion adding unit 702 is added.

The weight adding unit 701 adds an amplitude weight and a phase weight to a signal of each antenna element. The weight adding unit 701 includes an amplitude adjuster and a phase shifter per antenna element. The amplitude adjuster adds an amplitude weight to a signal of an antenna element, and the phase shifter adds a phase weight to the signal of the antenna element. That is, the weight adding unit 701 sets an amplitude difference and a phase difference to a signal per antenna element, and performs beamforming to control a direction of a directional beam.

Furthermore, the weight adding unit 701 controls an amplitude weight of a signal of each antenna element such that a signal is input only to a power amplifier subject to generation of an amplifier model when an amplifier model of each of the power amplifiers is generated. Specifically, the weight adding unit 701 sets, for example, an amplitude weight of a power amplifier subject to generation of an amplifier model to 0 decibels (dB), and sets an amplifier weight of the other amplifiers to −∞ dB. By thus setting, the weight adding unit 701 is capable of making a signal output only from the power amplifier subject to generation of an amplifier model.

The amplifier model is generated to determine pseudo distortion corresponding to a variation of characteristics of the power amplifier as described later. Moreover, in the present embodiment, the weight adding unit 125 of the processor 120 adds a weight similar to the amplitude weight and the phase weight added by the weight adding unit 701 to a demultiplex signal.

The pseudo-distortion adding unit 702 adds pseudo distortion corresponding to a variation of characteristics of the power amplifier to each of plural demultiplex signals output from the weight adding unit 125. The characteristics of the amplifiers provided per antenna element are not uniform, and the characteristics of the power amplifiers vary according to the individual differences. The pseudo-distortion adding unit 702 suppresses accuracy degradation in coefficient update due to a variation of characteristics of the power amplifier by adding pseudo distortion corresponding to the variation of characteristics to a demultiplex signal.

Figure 14:
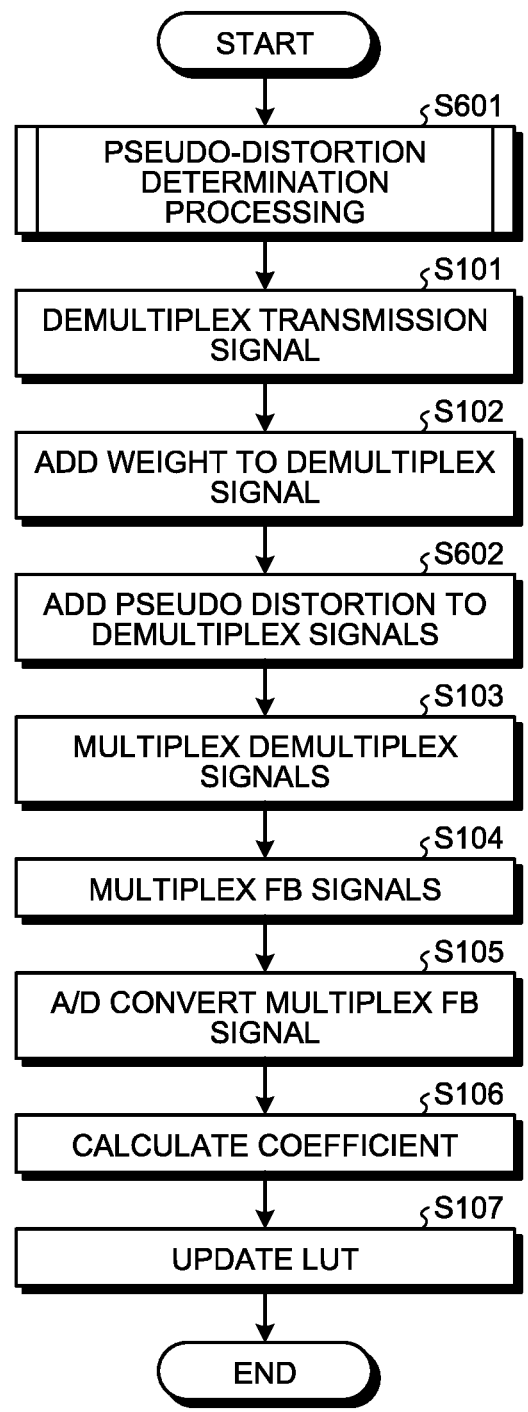
FIG. 14 is a flowchart illustrating a coefficient update method according to the seventh embodiment.

Subsequently, an update method of a distortion compensation coefficient in the RRH 100 configured as described above is described with reference to the flowchart illustrated in FIG. 14. In FIG. 14, like reference symbols are given to like parts with FIG. 3, and detailed description thereof is omitted. Coefficient update processing described in the following is mainly performed by the processor 120.

Prior to update of a distortion compensation coefficient, a variation of characteristics of the power amplifier of each antenna element is measured, and processing of determining pseudo distortion corresponding to this variation is performed (step S601). Specifically, an amplifier model of each of the power amplifiers is generated, and pseudo distortion corresponding to a variation of characteristics of the power amplifier is determined from the amplifier model. The determined pseudo distortion is set in the pseudo-distortion adding unit 702. Pseudo-distortion determination processing is described in detail later.

The transmission baseband signal is demultiplexed into demultiplex signals as many as the number of the antenna elements of the RRH 100 by the demultiplexer 124 (step S101). To each of the demultiplex signals, a weight equivalent to an amplitude weight and a phase weight added by the weight adding unit 701 for beamforming are added by the weight adding unit 125 (step S102).

Subsequently, the pseudo-distortion adding unit 702 adds the pseudo distortion corresponding to the variation of characteristics of the power amplifier to each of the demultiplex signals (step S602). With the pseudo distortion added to the demultiplex signal, each of the demultiplex signal acquires a variation similar to the variation of characteristics of the power amplifier of each antenna element. The demultiplex signals to which the pseudo distortion is added are multiplexed by the multiplexer 126 (step S103). The multiplex signal obtained by multiplexing is input to the coefficient update unit 127 as a reference signal of the coefficient update.

On the other hand, the transmission baseband signal is subjected to distortion compensation by the distortion compensating unit 123, subjected to D/A conversion and up conversion, and then demultiplexed into signals of the respective antenna elements by the demultiplexer 150. A signal of each of the antenna elements is given an amplitude weight and phase weight for beamforming by the weight adding unit 701, and is amplified by the power amplifier, and is then transmitted to wireless space. Moreover, the signal amplified by the power amplifier is fed back to the multiplexer 170.

The FB signals fed back from the respective antenna elements are multiplexed as they are by the multiplexer 170 (step S104). That is, the FB signals per antenna element are multiplexed by the multiplexer 170 without passing through circuits, such as a phase shifter and a down converter. Thus, the multiplex FB signal is a signal obtained by multiplexing plural FB signals affected by the variations of characteristics of the power amplifiers of the respective antenna elements.

The multiplex FB signal is down converted by the down converter, and is then A/D converted by the A/D converter

180 (step S105). Subsequently, the multiplex FB signal converted into a digital signal is input to the coefficient update unit 127 of the processor 120. When the multiplex signal and the multiplex FB signal are input to the coefficient update unit 127, a distortion compensation coefficient that minimizes a difference between the multiplex signal and the multiplex FB signal is calculated (step S106). The distortion compensation coefficient calculated by the coefficient update unit 127 replaces the distortion compensation coefficient stored in the LUT 122, and the LUT 122 is updated (step S107).

Figure 15:
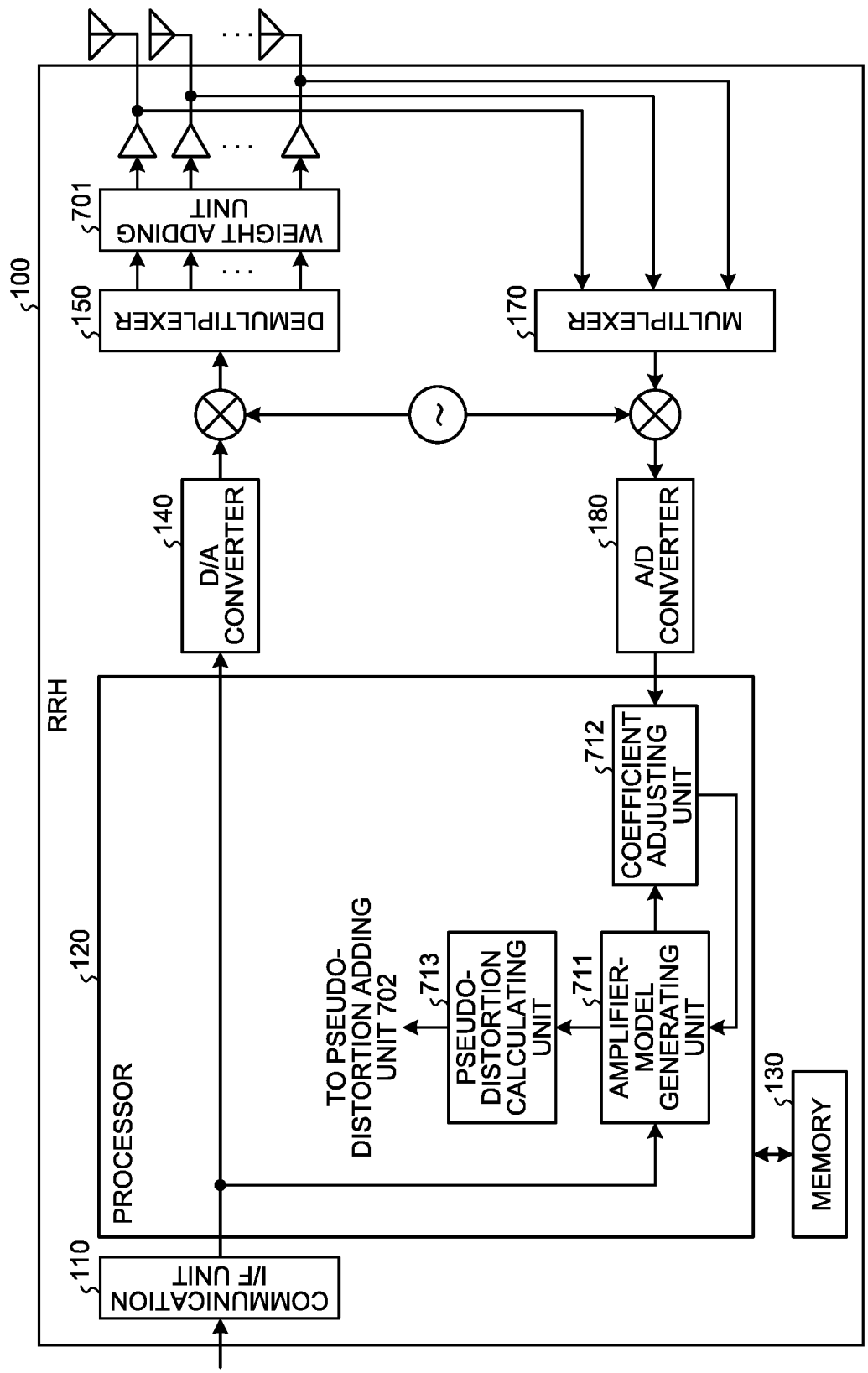
FIG. 15 is a block diagram illustrating a configuration of a principal part of an RRH according to the seventh embodiment.

Next, determination of pseudo distortion to be set in the pseudo-distortion adding unit 702 is described. FIG. 15 is a block diagram of an RRH 100 illustrating a processing unit involved in determination of pseudo distortion. The RRH 100 includes an amplifier-model generating unit 711, a coefficient adjusting unit 712, and a pseudo-distortion calculating unit 713, as illustrated in FIG. 15, in addition to the processing units illustrated in FIG. 13.

The amplifier-model generating unit 711 generates an amplifier model, which is a model of each of the power amplifiers provided per antenna element. Specifically, the amplifier-model generating unit 711 applies an amplifier model to a transmission baseband signal, and outputs a signal thus obtained to the coefficient adjusting unit 712. The amplifier-model generating unit 711 repeats replacing a coefficient of the amplifier model with a coefficient output from the coefficient adjusting unit 712, to generate an amplifier model corresponding to each of the power amplifiers. The amplifier-model generating unit 711 generates one amplifier model for each of the power amplifiers. Therefore, the weight adding unit 701 controls an amplitude weight of each antenna element such that a signal is fed back from only the power amplifier subject to generation of the amplifier model. That is, the weight adding unit 701 sets, for example, the amplifier weight of the power amplifier subject to generation of the amplifier model to 0 dB, and sets an amplifier weight of the other amplifiers to −∞ dB.

The coefficient adjusting unit 712 adjusts a coefficient of an amplifier model such that a difference between a signal output from the amplifier-model generating unit 711 and an FB signal becomes small. That is, the coefficient adjusting unit 712 adjusts an amplifier model such that a difference between a transmission baseband signal to which an amplifier model corresponding to either one of the power amplifiers is applied and an FB signal that is fed back from this power amplifier is minimized. The coefficient adjusting unit 712 outputs the adjusted coefficient to the amplifier-model generating unit 711.

When amplifier models corresponding to all of the power amplifiers are generated by the amplifier-model generating unit 711, the pseudo-distortion calculating unit 713 calculates pseudo distortion from these amplifier models. Specifically, the pseudo-distortion calculating unit 713 calculates an average amplifier characteristic that is an average characteristic of all of the power amplifiers from the amplifier models. The pseudo-distortion calculating unit 713 then calculates pseudo distortion of each of the power amplifiers by subtracting the average amplifier characteristic from the amplifier model of each power amplifier. That is, the pseudo-distortion calculating unit 713 calculates pseudo distortion corresponding to a variation of characteristics of the power amplifier by subtracting the average amplifier characteristic from the characteristics of the individual power amplifier. The pseudo-distortion calculating unit 713 notifies the calculated pseudo distortion of each of the power amplifiers to the pseudo-distortion adding unit 702.

Figure 16:
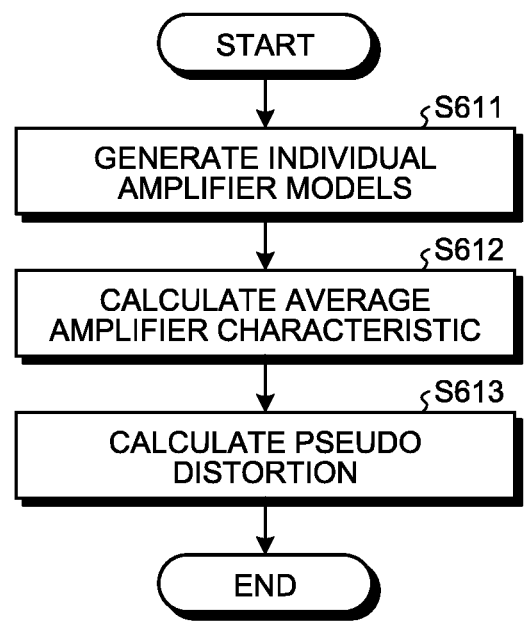
FIG. 16 is a flowchart illustrating pseudo-distortion determination processing.

Next, the pseudo-distortion determination processing is described with reference to a flowchart illustrated in FIG. 16. The pseudo-distortion determination processing described in the following is performed at step S601 in FIG. 14.

The pseudo-distortion determination processing is performed, for example, before normal operation of the RRH 100 or the like. First, the weight adding unit 701 sets an amplitude weight of one power amplifier to 0 dB, and sets an amplifier weight of the other power amplifiers to −∞ dB. The power amplifier for which the amplitude weight is set to 0 dB is the power amplifier subject to generation of an amplifier model, and only a signal output from this power amplifier is fed back to the processor 120.

The amplifier-model generating unit 711 generates an amplifier model of the power amplifier subject to generation of an amplifier model. Specifically, a signal that is obtained by applying the amplifier model to a transmission baseband signal is output to the coefficient adjusting unit 712, and the coefficient adjusting unit 712 adjusts a coefficient of the amplifier model such that a difference between a signal output from the amplifier-model generating unit 711 and an FB signal that is fed back from the power amplifier is small. The adjusted coefficient is output to the amplifier-model generating unit 711, and the coefficient of the amplifier is thus updated. The processing as described above is repeated, and when the difference between the transmission baseband signal to which the amplifier model is applied and the FB signal satisfies a predetermined standard in the coefficient adjusting unit 712, the amplifier model is generated.

By performing the above processing while sequentially changing the power amplifier to which the amplitude weight is set to 0 dB, amplifier models of individual power amplifiers are generated (step S611). When amplifier models of all of the power amplifiers are generated, the pseudo-distortion calculating unit 713 calculates an average amplifier characteristic from the amplifier models of all of the power amplifiers (step S612) The average amplifier characteristic is to be a reference of a variation of characteristics of power amplifiers. Therefore, by subtracting the average amplifier characteristic from the amplifier model of each of the power amplifiers by the pseudo-distortion calculating unit 713, pseudo distortion corresponding to a variation of characteristics of the individual power amplifier is calculated (step S613). The calculated pseudo distortion is notified to the pseudo-distortion adding unit 702, and is added to the respective demultiplex signals.

As described above, according to the present embodiment, pseudo distortion corresponding to a variation of characteristics of a power amplifier is calculated, and the pseudo distortion is added to respective demultiplex signals. Therefore, when a distortion compensation coefficient is updated by comparing a multiplex signal that is obtained by multiplexing demultiplex signals and a multiplex FB signal that is obtained by multiplexing signals fed back from respective power amplifiers, an influence for variations of characteristics of the power amplifiers can be reduced, and reduction in the distortion compensation performance can be suppressed.

In the seventh embodiment described above, an amplitude weight and a phase weight are added to a signal of an antenna element. In embodiments other than the present embodiment also, the weight adding unit 160 may add not only a phase weight but also an amplitude weight in a similar manner.

[h] Eighth Embodiment

A feature of an eighth embodiment is a point that amplifier models of individual power amplifiers are generated sequentially by controlling a power source voltage of the power amplifiers.

A configuration of a communication system according to the eighth embodiment is similar to that of the first embodiment (FIG. 1), description thereof is omitted. Moreover, a configuration of the RRH 100 according to the eighth embodiment is similar to that of the seventh embodiment (FIG. 13), and description thereof is omitted. However, in the RRH 100 according to the eighth embodiment, a configuration relating to determination of pseudo distortion is different from that of the RRH 100 according to the seventh embodiment.

Figure 17:
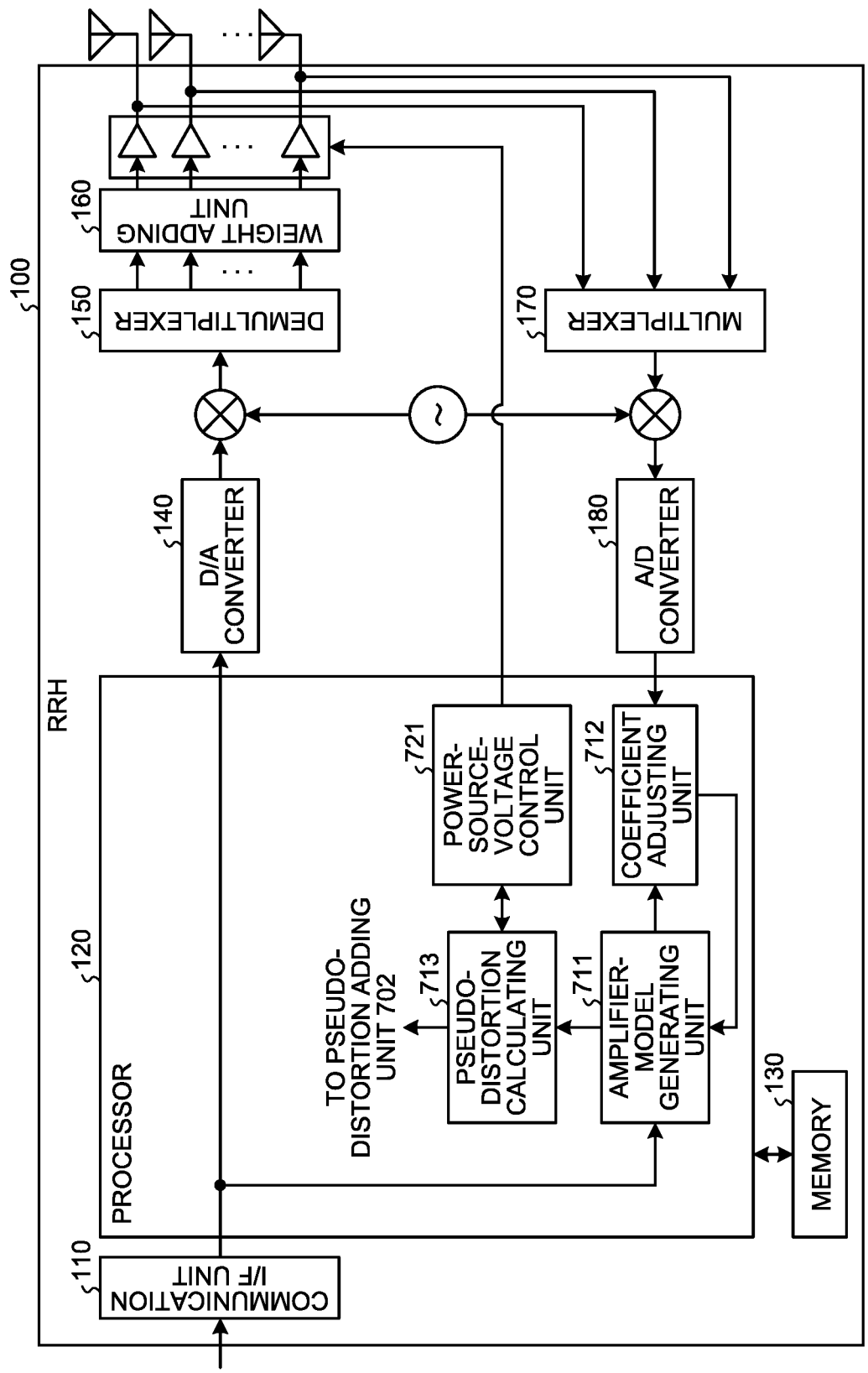
FIG. 17 is a block diagram illustrating a configuration of a principal part of an RRH according to an eighth embodiment.

FIG. 17 is a block diagram of the RRH 100 illustrating processing units involved in determination of pseudo distortion. In FIG. 17, like reference symbols with FIG. 15 are given thereto, and description thereof is omitted. The RRH 100 illustrated in FIG. 17 has a configuration that includes the weight adding unit 160 in place of the weight adding unit 701 in the RRH 100 illustrated in FIG. 15, and in which a power-source-voltage control unit 721 is added.

The power-source-voltage control unit 721 controls a power source voltage, when generating amplifier models of the respective power amplifiers, such that only a power source of a power amplifier subject to generation of an amplifier model is turned on and power sources of the other power amplifiers are turned off. Thus, the power-source-voltage control unit 721 can arrange such that a signal is output only from the power amplifier subject to generation of an amplifier model.

In the eighth embodiment, the poser source of one of the power amplifiers is turned on, and the power sources of the other power amplifiers are turned off by the power-source-voltage control unit 721. The power amplifier, the power source of which is turned on is the power amplifier subject to generation of an amplifier model, and only a signal output from this power amplifier is fed back to the processor 120.

The amplifier-model generating unit 711 generates an amplifier model of the power amplifier subject to generation of an amplifier model. Specifically, a signal that is obtained by applying an amplifier model to a transmission baseband signal is output to the coefficient adjusting unit 712, and the coefficient adjusting unit 712 adjusts a coefficient of the amplifier model such that a difference between a signal output from the amplifier-model generating unit 711 and an FB signal fed back from the power amplifier becomes small. The adjusted coefficient is output to the amplifier-model generating unit 711, and the coefficient of the amplifier model is thus updated. The processing as described above is repeated, and when the difference between the transmission baseband signal to which the amplifier model is applied and the FB signal satisfies a predetermined standard in the coefficient adjusting unit 712, the amplifier model is generated.

By performing the above processing while sequentially changing the power amplifier for which the power source is turned on, amplifier models of individual power amplifiers are generated. From the generated amplifier models, pseudo distortion to be set in the pseudo-distortion adding unit 702 is determined similarly to the seventh embodiment.

As described above, according to the present embodiment, amplifier models of individual power amplifiers are sequentially generated while turning on a power source of power amplifier subject to generation of an amplifier model, and turning off power sources of other power amplifiers. Accordingly, it is possible to calculate an average amplifier characteristic from the amplifier models of the individual power amplifiers, and to determine pseudo distortion corresponding to a variation of characteristics of the power amplifier.

[i] Ninth Embodiment

A feature of a ninth embodiment is a point that amplifier models of individual power amplifiers are sequentially generated by controlling a switch that is arranged on an output side of the power amplifier.

A configuration of a communication system according to the ninth embodiment is similar to that of the first embodiment (FIG. 1), and description thereof is omitted. Moreover, a configuration of the RRH 100 according to the ninth embodiment is similar to that of the seventh embodiment (FIG. 13), and description thereof is omitted. However, in the RRH 100 according to the ninth embodiment, a configuration relating to determination of pseudo distortion is different from that of the RRH 100 according to the seventh embodiment.

Figure 18:
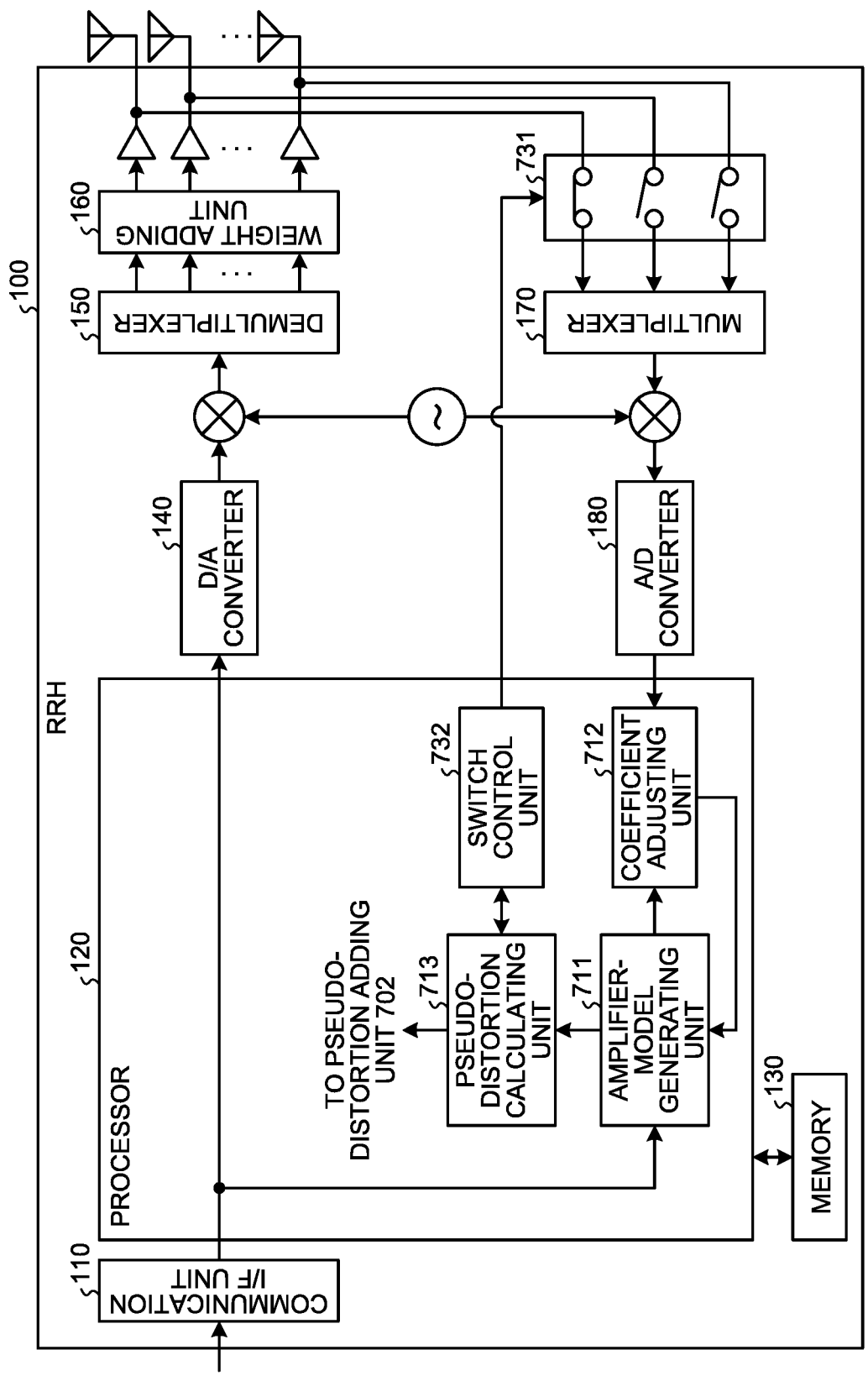
FIG. 18 is a block diagram illustrating a configuration of a principal part of an RRH according to a ninth embodiment.

FIG. 18 is a block diagram of the RRH 100 illustrating processing units involved in determination of pseudo distortion. In FIG. 18, like reference symbols are given to like parts with FIG. 15, and description thereof is omitted. The RRH 100 illustrated in FIG. 18 has a configuration that includes the weight adding unit 160 in place of the weight adding unit 701 in the RRH 100 illustrated in FIG. 15, and in which a switch 731 and a switch control unit 732 are added.

The switch 731 is arranged between the respective power amplifiers and the multiplexer 170, and switches on and off input of an FB signal from the respective power amplifiers to the multiplexer 170. That is, the switch 731 switches connection between the respective power amplifier and the multiplexer 170 to let an FB signal from a power amplifier connected to the multiplexer 170 input to the multiplexer 170, and to make an FB signal from a power amplifier disconnected from the multiplexer 170 not to be input to the multiplexer 170.

The switch control unit 732 controls a switch, when amplifier models of the respective power amplifiers are generated, such that only a power amplifier subject to generation of an amplifier model is connected to the multiplexer 170, and the other amplifiers are disconnected from the multiplexer 170. Thus, the switch control unit 732 controls to input only an FB signal output from the power amplifier subject to generation of an amplifier model to the multiplexer 170.

In the ninth embodiment, the switch control unit 732 controls the switch 731, and one of the power amplifiers is thereby connected to the multiplexer 170 and the other power amplifiers are disconnected from the multiplexer 170. The power amplifier connected to the multiplexer 170 is the power amplifier subject to generation of an amplifier model, and only a signal output from this amplifier is fed back to the processor 120.

The amplifier-model generating unit 711 generates an amplifier model of the power amplifier subject to generation of an amplifier model. Specifically, a signal that is obtained by applying an amplifier model to a transmission baseband signal is output to the coefficient adjusting unit 712, and the coefficient adjusting unit 712 adjusts a coefficient of the amplifier model such that a difference between a signal output from the amplifier-model generating unit 711 and an FB signal fed back from the power amplifier becomes small. The adjusted coefficient is output to the amplifier-model generating unit 711, and the coefficient of the amplifier model is thus updated. The processing as described above is repeated, and when the difference between the transmission baseband signal to which the amplifier model is applied and the FB signal satisfies a predetermined standard in the coefficient adjusting unit 712, the amplifier model is generated.

By performing the above processing while sequentially changing the power amplifier to be connected to the multiplexer 170, amplifier models of individual power amplifiers are generated. From the generated amplifier models, pseudo distortion to be set in the pseudo-distortion adding unit 702 is determined similarly to the seventh embodiment.

As described above, according to the present embodiment, amplifier models of individual power amplifiers are sequentially generated while controlling a switch such that a signal from a power amplifier subject to generation of an amplifier model is fed back and a signal from other power amplifiers is not fed back. Accordingly, it is possible to calculate an average amplifier characteristic from the amplifier models of the individual power amplifiers, and to determine pseudo distortion corresponding to a variation of characteristics of the power amplifier.

In the seventh to the ninth embodiments described above, pseudo distortion corresponding to a variation of characteristics of a power amplifier is added to a demultiplex signal, but there are variations also in characteristics of analog paths through which an FB signal passes. That is, because FB signals from the respective power amplifiers are input to the multiplexer 170 passing through different analog paths, the distortion compensation performance is also affected by the variations of characteristics of the analog paths. For this reason, not only variations of power amplifiers but also variations of characteristics of analog paths may be compensated.

Figure 19:
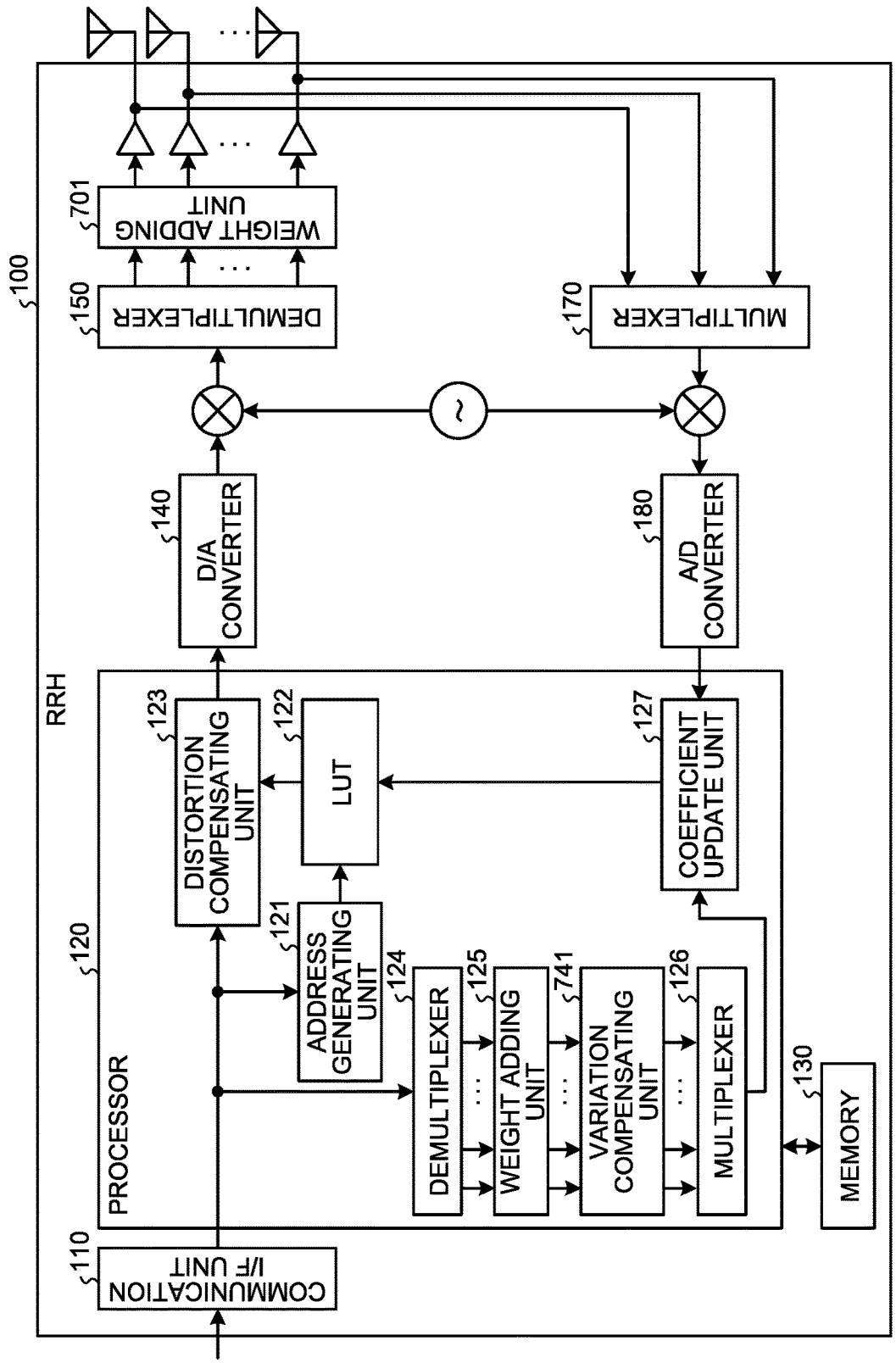
FIG. 19 is a block diagram illustrating a configuration of an RRH according to another embodiment.

FIG. 19 is a block diagram illustrating a configuration of the RRH 100 that compensates variations of characteristics of power amplifiers and analog paths. In FIG. 19, like reference symbols are given to like parts with FIG. 13. The RRH 100 illustrated in FIG. 19 includes a variation compensating unit 741 in place of the pseudo-distortion adding unit 702 of the RRH 100 illustrated in FIG. 13.

The variation compensating unit 741 adds pseudo distortion corresponding to a variation of characteristics of a power amplifier to a demultiplex signal, and adds pseudo distortion corresponding to a variation of characteristics of an analog path to the demultiplex signal. Specifically, the variation compensating unit 741 adds pseudo distortion corresponding to a variation of characteristics of a power amplifier determined similarly to the seventh embodiment to a demultiplex signal. Moreover, the variation compensating unit 741 adds pseudo distortion corresponding to a variation of characteristics of an analog path calculated similarly to the pseudo distortion corresponding to a variation of characteristics of a power amplifier to a demultiplex signal. The variations of characteristics include, for example, variations in gain, phase, delay difference, and frequency characteristics. Pseudo distortion corresponding to the variations of these characteristics can be determined by generating models of respective analog paths, and by subtracting an average characteristic from the respective models.

[j] Tenth Embodiment

In the first to the ninth embodiments described above, a multiplex FB signal is generated by multiplexing FB signals from power amplifiers of respective antenna elements, and at this time, plural FB signals are subjected to in-phase synthesis. Therefore, a multiplex FB signal can correspond to a null point depending on a direction of a directional beam formed by beamforming, and the amplitude of the multiplex FB signal can be $-\infty$, thereby causing reduction of distortion compensation performance.

Figure 20:
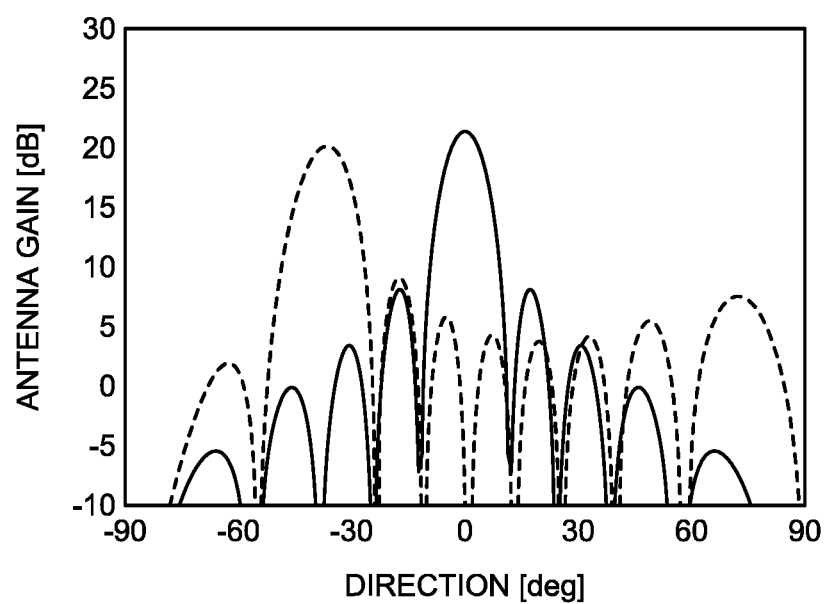
FIG. 20 illustrates a specific example of an antenna gain according to a beam direction.

Specific examples of antenna gain when a direction of a directional beam is 0 degrees and $-38$ degrees are illustrated in FIG. 20. In FIG. 20, a solid line expresses an antenna gain when the direction of the directional beam is 0 degrees, and a broken line expresses an antenna gain when the direction of the directional beam is $-38$ degrees. As illustrated in FIG. 20, when the direction of the directional beam is 0 degrees, a main lobe is formed in a direction of 0 degrees and, therefore, the amplitude of the multiplex FB signal corresponds to the main lobe. On the other hand, when the direction of the directional beam is $-38$ degrees, a null is formed in the direction of 0 degrees and, therefore, the amplitude of the multiplex FB signal is to be $-\infty$, and update of a distortion compensation coefficient is not performed properly. As described, when a multiplex FB signal is generated by in-phase synthesis of FB signals, the multiplex FB signal can correspond to a null point, and update of a distortion compensation coefficient can be difficult.

For this reason, in the tenth embodiment, a case of reducing a possibility that the amplifier of a multiplex FB signal becomes $-\infty$ by controlling the amplitude of an FB signal is described.

A configuration of a communication system according to the tenth embodiment is similar to that of the first embodiment (FIG. 1), description thereof is omitted. In the tenth embodiment, a configuration of the RRH 100 is different from that of the first embodiment.

Figure 21:
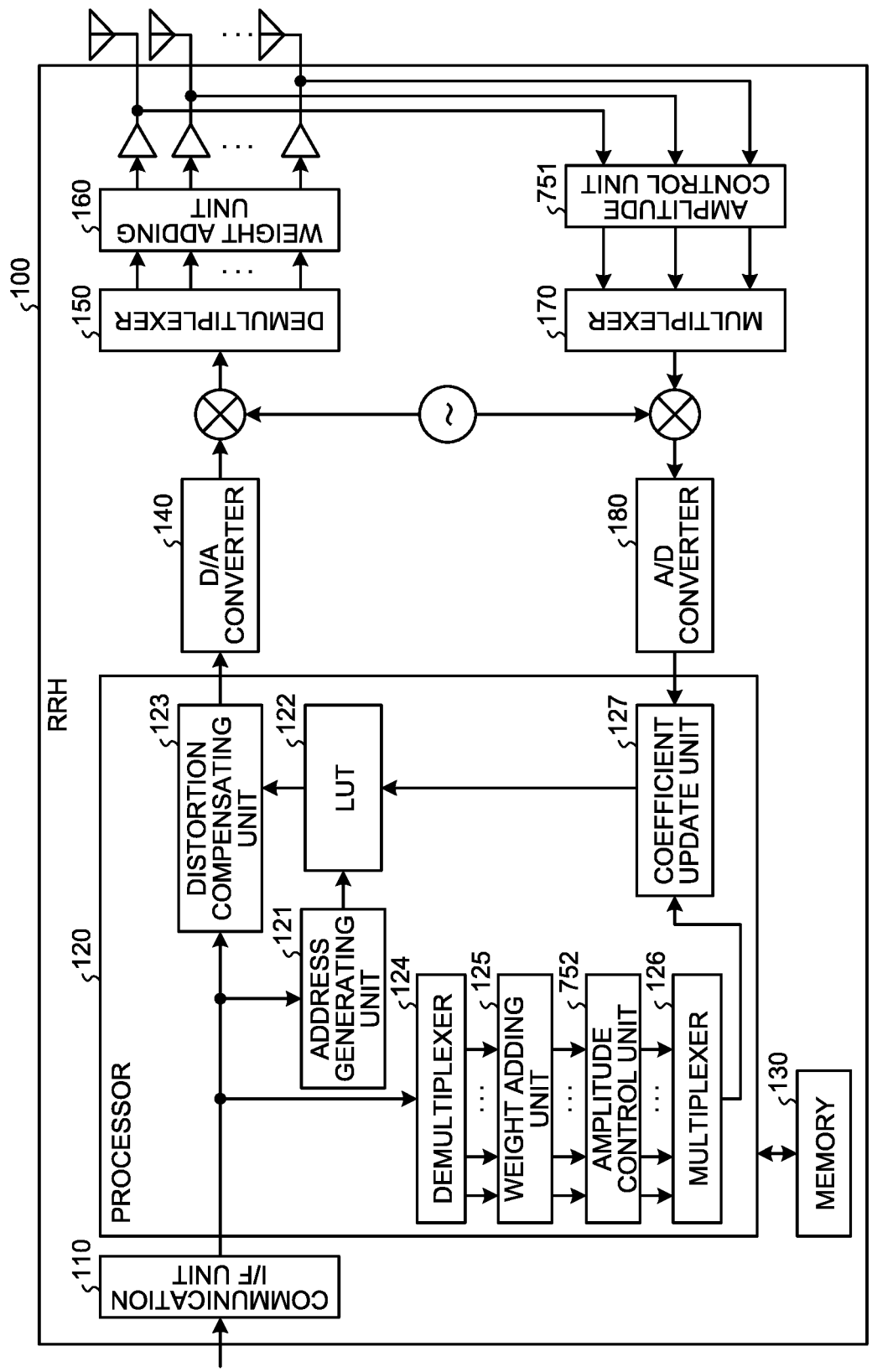
FIG. 21 is a block diagram illustrating a configuration of an RRH according to a tenth embodiment.

FIG. 21 is a block diagram illustrating a configuration of the RRH 100 according to the tenth embodiment. In FIG. 21, like reference symbols are given to like parts with FIG. 2, and description thereof is omitted. The RRH 100 illustrated in FIG. 21 has a configuration in which amplitude control units 751 and 752 are added to the RRH 100 illustrated in FIG. 2.

The amplitude control unit 751 controls an amplitude of an FB signal by multiplying each FB signal from the power amplifier provided per antenna element by a tap coefficient. At this time, the amplitude control unit 751 multiplies respective FB signals by tap coefficient different from one another. For example, the amplitude control unit 751 multiplies an FB signal by a monotone decreasing or monotone increasing tap coefficient according to an alignment sequence of the antenna elements.

The amplitude control unit 752 controls an amplitude of a demultiplex signal by multiplying each demultiplex signal by a coefficient similar to that of the amplitude control unit 751. Respective coefficients by which the demultiplex signals are multiplied by the amplitude control unit 752 are the same value as either one of the tap coefficients by which the FB signals are multiplied by the amplitude control unit 751.

Next, the tap coefficient by which an FB signal is multiplied by the amplitude control unit 751 is specifically described.

When a direction of a directional beam is 0, an interval between the antenna elements is d, a wavelength of an FB signal is $\lambda$, and a tap coefficient by which each FB signal is multiplied is $w_n$, a multiplex FB signal $v(\theta)$ can be expressed as following Equation (1).

$$v(\theta) = \sum_{n=0}^{N-1} w_n e^{j2\pi \frac{d}{\lambda} n \sin(\theta)} \qquad (1)$$

Note that n is an index number of an antenna element, and N is a total number of the antenna elements in Equation (1). When above Equation (1) is changed into a power level, following Equation (2) is obtained.

$$P(\theta) = |v(\theta)|^2 = \sum_{n=0}^{N-1} w_n^2 + 2 \sum_{n=1}^{N-1} \cos\left(2\pi \frac{d}{\lambda} n \sin(\theta)\right) \sum_{m=0}^{N-1-n} w_{m+n} w_m \qquad (2)$$

Note that m is an index number of an antenna element in Equation (2). While a first term in Equation (2) is a fixed component, a second term is a component that varies according to the direction θ of the directional beam. Therefore, as the second term, which is a variable component, becomes large compared with the first term, which is a fixed component, a power P(θ) is likely to decrease to 0, and a null is likely to occur.

When the tap coefficient $w_n$ is all the same value, a multiplex FB signal v(θ) is to be equivalent to a signal transmitted from an antenna element, and to be a signal causing a null. That is, in the case of Equation (3) below, a null occurs.

$$P(\theta) = |v(\theta)|^2 = N + 2 \sum_{n=1}^{N-1} (N-n) \cos\left(2\pi \frac{d}{\lambda} n \sin(\theta)\right) \qquad (3)$$

The condition under which a null is unlikely to occur is that the first term is large and the second term is small in above Equation (2) compared with Equation (3) and, therefore, it is preferable that each of the tap coefficient $w_n$ satisfy a condition of Equation (4) below.

$$\frac{N-n}{N} > \frac{\sum_{n=1}^{N-1} w_{m+n} w_m}{\sum_{n=1}^{N-1} w_n^2} \qquad (4)$$

As an example of a tap coefficient that satisfies the condition as above, for example, there is a tap coefficient that monotone decreases or monotone increases according to an alignment sequence of antenna elements. FIG. 22 illustrates a specific example of a tap coefficient that satisfies the condition of above Equation (4). In FIG. 22, specific examples of four kinds of tap coefficient groups are illustrated from a top row to a bottom row. In each row, a diagram on the left represents an excitation amplitude corresponding to a tap coefficient per antenna element, and a diagram on the right represents a value of autocorrelation. In the diagrams on the right of the respective rows, a broken line expresses a reference value when the tap coefficients are all equal, and a solid line expresses an autocorrelation coefficient when the tap coefficient group in the diagram on the left is applied. When the autocorrelation coefficient is smaller than the reference value, a null is unlikely to occur.

On the top row, a tap coefficient group that monotone decrease according to the alignment sequence of the antenna element is presented. In this case, the autocorrelation coefficient is smaller than the reference value in all harmonic components, and a null is not formed in any direction in which the direction of the directional beam is. Similarly, on the second top row, a tap coefficient group that monotone increases according to the alignment sequence of the antenna elements is presented. In this case also, the autocorrelation coefficient is smaller than the reference value in all harmonic components, and a null is not formed in any direction in which the direction of the directional beam is.

Furthermore, on the third and the fourth row, tap coefficient groups that monotone decrease or monotone increase according to the alignment sequence of the antenna elements with an antenna element positioned near the center as a starting point are presented. Also in the case in which an antenna element near the center, not an antenna element at an end, is a starting point as described, the autocorrelation coefficient is smaller than the reference value in all harmonic components, and a null is not formed in any direction in which the direction of the directional beam is.

Figure 23:
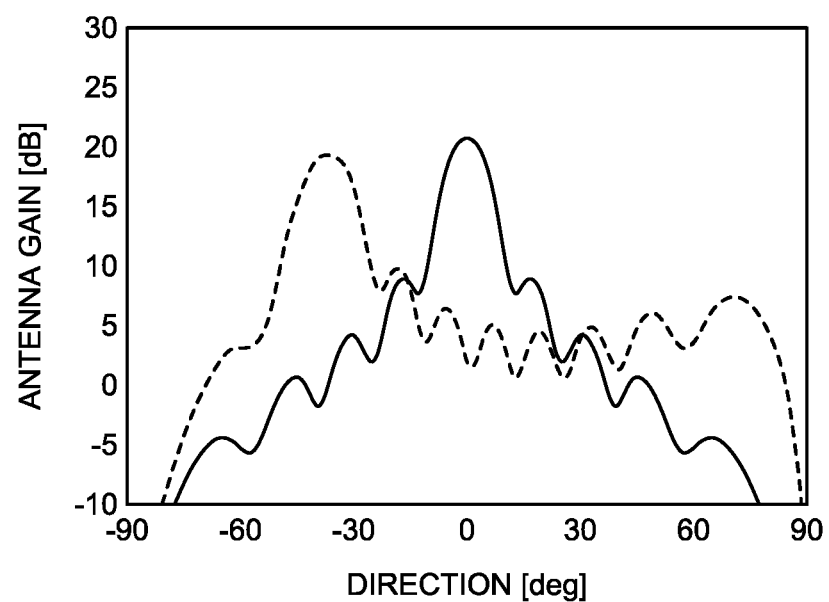
FIG. 23 illustrates a specific example of an antenna gain according to a beam direction.

An example of an antenna gain in a case in which a signal of each antenna element is multiplied by the tap coefficient as described above is illustrated in FIG. 23. In FIG. 23, a solid line expresses an antenna gain when the direction of a directional beam is 0 degrees, and a broken line expresses an antenna gain when the direction of a directional beam is −38 degrees. As illustrate in FIG. 23, when the direction of a directional beam is 0 degrees, a main lobe is formed in the direction of 0 degrees and, therefore, the amplitude of a multiplex FB signal corresponds to the main lobe. Moreover, also when the direction of a directional beam is −38 degrees, a null is not formed in the direction of 0 degrees, and the amplitude of the multiplex FB signal is not to be −∞. As a result, a multiplex FB signal with an appropriate amplitude is fed back to the processor 120, and a distortion compensation coefficient can be updated such that a difference between a multiplex signal and a multiplex FB signal becomes small.

As described above, according to the present embodiment, a multiplex FB signal is generated after each of FB signals of respective antenna elements are multiplied by a tap coefficient, to be fed back, and demultiplex signals are also multiplied by a coefficient same as the tap coefficient. Therefore, when a distortion compensation coefficient is updated by comparison between a multiplex signal that is obtained by multiplexing demultiplex signals and a multiplex FB signal, it is possible to make an amplitude of the multiplex FB signal be an amplitude within an appropriate range, and to suppress reduction of distortion compensation performance.

In the respective embodiments described above, the case in which distortion compensation is performed by using a distortion compensation coefficient stored in an LUT has been described, but the coefficient update method of the respective embodiments described above may be applied to, for example, a case in which a distortion compensation coefficient is calculated by a polynomial expression to perform distortion compensation. That is, a multiplex FB signal may be generated by multiplexing FB signals from plural antenna elements as they are, and may be used for update of a coefficient of a polynomial expression by feeding back the multiplex FB signal. In this case also, because a phase shifter or an A/D converter is not necessary in a feedback system, increase of the circuit scale can be suppressed.

Moreover, the respective embodiments described above can be appropriately combined to be implemented. Specifically, for example, combining the second and the fourth embodiments, a multiplex signal may be used for address generation, and a maximum amplitude of a multiplex signal may be detected for level adjustment of a multiplex FB signal. Furthermore, for example, combining the third and the sixth embodiments, an inverse-weighted FB signal may be subjected to distortion compensation, and a distortion compensation coefficient may be updated based on a result of comparison between a transmission baseband signal subjected to distortion compensation and the inverse-weighted FB signal subjected to distortion compensation. Furthermore, combining the seventh and the tenth embodiments, a demultiplex signal may be multiplied by a coefficient same as tap coefficient by which an FB signal is multiplied, while adding pseudo distortion corresponding to a variation of characteristics of a power amplifier to the demultiplex signal. Various other kinds of combinations are possible.

According to one aspect of the multiantenna communication device and the coefficient update method disclosed in the present application, an effect of suppressing increase of a circuit scale is obtained.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A multiantenna communication device that forms a directional beam by adding an antenna weight to respective signals of a plurality of antenna elements, the multiantenna communication device comprising:
    a processor that executes performing distortion compensation on a transmission signal by using a distortion compensation coefficient;
    a plurality of power amplifiers that are provided corresponding to the antenna elements, and that amplify the transmission signal subjected to the distortion compensation by the processor;
    a multiplexer that multiplexes signals output from the power amplifiers to feed back; and
    an analog/digital (A/D) converter that A/D converts a multiplex feedback signal that is obtained by the multiplexer, wherein
    the processor executes:
    generating demultiplex signals as many as number of the antenna elements by demultiplexing the transmission signal;
    adding a weight same as an antenna weight per antenna element to each of the generated demultiplex signals;
    generating a multiplex signal by multiplexing the demultiplex signals to which the weight is added; and
    updating the distortion compensation coefficient by using the multiplex feedback signal A/D converted by the A/D converter and the multiplex signal.

2. The multiantenna communication device according to claim 1, wherein the performing the distortion compensation includes:
    generating, based on the multiplex signal, an address of a lookup table that stores the distortion compensation coefficient; and
    subjecting the transmission signal to distortion compensation by using a distortion compensation coefficient stored at the generated address.

3. The multiantenna communication device according to claim 1, further comprising
    a level adjusting unit that adjusts a level of the multiplex feedback signal that is obtained by the multiplexer, wherein
    the processor further executes detecting an amplitude of the multiplex signal and the multiplex feedback signal, and
    the level adjusting unit adjusts a level of the multiplex feedback signal according to a maximum amplitude detected by the processor.

4. The multiantenna communication device according to claim 1, wherein
    the multiplexer multiplexes signals output from part of power amplifiers out of the power amplifiers to feed back, and
    the updating includes:
    generating a partial multiplex signal by multiplexing part of the multiplex signals to which the weight is added; and
    updating the distortion compensation coefficient by using the partial multiplex signal and a partial multiplex feedback signal that is obtained by the multiplexer.

5. The multiantenna communication device according to claim 1, wherein the updating further includes adding pseudo distortion corresponding to a variation of characteristics of the power amplifiers, to each of the demultiplex signals to which the weight is added.

6. The multiantenna communication device according to claim 5, wherein the processor further executes:
    generating an amplifier model that indicates a characteristic of the power amplifiers; and
    calculating the pseudo distortion based on the generated amplifier model.

7. The multiantenna communication device according to claim 6, wherein the generating the amplifier model includes:
    controlling the antenna weight to cause a signal output from individual power amplifiers to be fed back; and
    generating, by using the signal fed back, an amplifier model of a power amplifier that has output the signal.

8. The multiantenna communication device according to claim 6, wherein the generating the amplifier model includes:
    controlling a power source voltage of the power amplifiers to cause a signal output from individual power amplifiers to be fed back; and
    generating, by using the signal fed back, an amplifier model of a power amplifier that has output the signal.

9. The multiantenna communication device according to claim 6, wherein the generating the amplifier model includes:
    controlling a switch arranged between the power amplifiers and the multiplexer to cause a signal output from individual power amplifiers to be fed back; and
    generating, by using the signal fed back, an amplifier model of a power amplifier that has output the signal.

10. The multiantenna communication device according to claim 5, wherein the updating further includes adding additional pseudo distortion corresponding to a variation of characteristic of an analog path between the power amplifiers and the multiplexer, to each of the demultiplex signals to which the pseudo distortion is added.

11. The multiantenna communication device according to claim 1, further comprising
an amplitude control unit that controls an amplitude by applying a tap coefficient to a signal output from the power amplifiers, wherein
the multiplexer multiplexes signals, an amplitude of which is controlled by the amplitude control unit, to feed back.

12. A coefficient update method performed by a multiantenna communication device that forms a directional beam by adding an antenna weight to respective signals of a plurality of antenna elements, the coefficient update method comprising:
generating demultiplex signals as many as number of the antenna elements by demultiplexing a transmission signal;
adding a weight same as an antenna weight per antenna element to each of the generated demultiplex signals;
generating a multiplex signal by multiplexing the demultiplex signals to which the weight is added;
performing distortion compensation on the transmission signal by using a distortion compensation coefficient;
amplifying the transmission signal subjected to the distortion compensation with a plurality of power amplifiers that are provided corresponding to the antenna elements;
multiplexing signals output from the power amplifiers to feed back;
A/D converting a multiplex feedback signal that is obtained by the multiplexing; and
updating the distortion compensation coefficient by using the multiplex feedback signal A/D converted and the multiplex signal.

* * * * *